United States Patent
You

(10) Patent No.: US 12,500,636 B2
(45) Date of Patent: Dec. 16, 2025

(54) METHOD AND APPARATUS FOR TRANSMISSION BASED ON POLARIZATION MULTIPLEXING IN COMMUNICATION SYSTEM

(71) Applicant: ELECTRONICS AND TELECOMMUNICATIONS RESEARCH INSTITUTE, Daejeon (KR)

(72) Inventor: Duk Hyun You, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 111 days.

(21) Appl. No.: 18/522,922

(22) Filed: Nov. 29, 2023

(65) Prior Publication Data

US 2024/0178892 A1     May 30, 2024

(30) Foreign Application Priority Data

Nov. 30, 2022 (KR) .................. 10-2022-0163603
Nov. 28, 2023 (KR) .................. 10-2023-0168245

(51) Int. Cl.
    *H04B 7/0456*      (2017.01)
    *H04B 7/10*      (2017.01)

(52) U.S. Cl.
    CPC ............ *H04B 7/0469* (2013.01); *H04B 7/10* (2013.01)

(58) Field of Classification Search
    CPC .................................................. H04B 7/0469
    USPC ........................................................ 375/262
    See application file for complete search history.

(56) References Cited

U.S. PATENT DOCUMENTS

| | | | |
|---|---|---|---|
| 9,338,662 B2 | 5/2016 | Kim et al. | |
| 9,520,914 B2 * | 12/2016 | Khan | H04B 7/10 |
| 9,716,541 B2 | 7/2017 | Sanderovich et al. | |
| 10,039,011 B2 | 7/2018 | Bahng et al. | |
| 2018/0176802 A1 * | 6/2018 | Rosenhouse | H04B 14/008 |
| 2019/0044250 A1 | 2/2019 | Pan | |
| 2021/0143871 A1 | 5/2021 | Ho et al. | |
| 2022/0209884 A1 * | 6/2022 | Tajima | H04B 10/6162 |
| 2022/0321391 A1 | 10/2022 | Jamal et al. | |
| 2022/0416444 A1 | 12/2022 | Kronfeld et al. | |

OTHER PUBLICATIONS

3GPP, 3rd Generation Partnership Project; Technical Specification Group Radio Access Network; NR; Base Station (BS) radio transmission and reception (Release 17), 3GPP TS 38.104 V17.7.0 (Sep. 2022).

3GPP, "3rd Generation Partnership Project; Technical Specification Group Radio Access Network; NR; Requirements for support of radio resource management (Release 17)", 3GPP TS 38.133 V17.7.0 (Sep. 2022).

(Continued)

*Primary Examiner* — Lihong Yu
(74) *Attorney, Agent, or Firm* — LRK PATENT LAW FIRM

(57) ABSTRACT

A method of a first communication node may comprise: generating a first polarized signal by performing first baseband processing on a first set of modulation symbols; generating a second polarized signal by multiplying the first polarized signal by a first conversion matrix; and transmitting the second polarized signal to a second communication node.

17 Claims, 10 Drawing Sheets

(56) References Cited

OTHER PUBLICATIONS

3GPP, "3rd Generation Partnership Project; Technical Specification Group Radio Access Network; NR; Physical channels and modulation (Release 17)", 3GPP TS 38.211 V17.3.0 (Sep. 2022).
3GPP, "3rd Generation Partnership Project; Technical Specification Group Radio Access Network; NR; Multiplexing and channel coding (Release 17)", 3GPP TS 38.212 V17.3.0 (Sep. 2022).
3GPP, "3rd Generation Partnership Project; Technical Specification Group Radio Access Network; NR; Physical layer procedures for control (Release 17)", 3GPP TS 38.213 V17.3.0 (Sep. 2022).
3GPP, "3rd Generation Partnership Project; Technical Specification Group Radio Access Network; NR; Physical layer procedures for data (Release 17)", 3GPP TS 38.214 V17.3.0 (Sep. 2022).
3GPP, "3rd Generation Partnership Project; Technical Specification Group Radio Access Network; NR; Medium Access Control (MAC) protocol specification (Release 17)", 3GPP TS 38.321 V17.2.0 (Sep. 2022).
3GPP, "3rd Generation Partnership Project; Technical Specification Group Radio Access Network; NR; Radio Resource Control (RRC) protocol specification (Release 17)", 3GPP TS 38.331 V17.2.0 (Sep. 2022).

\* cited by examiner

METHOD AND APPARATUS FOR TRANSMISSION BASED ON POLARIZATION MULTIPLEXING IN COMMUNICATION SYSTEM

CROSS-REFERENCE TO RELATED APPLICATIONS

This application claims priority to Korean Patent Applications No. 10-2022-0163603, filed on Nov. 30, 2022, and No. 10-2023-0168245, filed on Nov. 28, 2023, with the Korean Intellectual Property Office (KIPO), the entire contents of which are hereby incorporated by reference.

BACKGROUND

1. Technical Field

Exemplary embodiments of the present disclosure relate to a multiplexing transmission technique, and more specifically, to a transmission technique based polarization multiplexing.

2. Description of Related Art

The communication system (e.g. a new radio (NR) communication system) using a higher frequency band (e.g. a frequency band of 6 GHz or above) than a frequency band (e.g. a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).

A communication network (e.g. NR network) may be classified into a terrestrial network and a non-terrestrial network. The non-terrestrial network may be referred to as an NTN. In a terrestrial network, communication services for a terminal may be provided by a base station located on the ground. In a non-terrestrial network, communication services for a terminal may be provided by a communication node (e.g. satellite, base station, unmanned aerial vehicle (UAV), drone, or the like) located in a non-terrestrial location. Communication in the terrestrial network and the non-terrestrial network may be performed based on the NR communication technology.

Meanwhile, the communication network can be designed to accommodate various scenarios, service requirements, and potential system compatibility. The communication network, such as a 5G communications network, is capable of supporting wideband communications in a high-frequency band. To facilitate wideband communication in a high-frequency band, beam-based communication can be employed. Multiplexing transmission techniques may be necessary to enhance the throughput of the communication network.

SUMMARY

Exemplary embodiments of the present disclosure are directed to providing a method and an apparatus for transmission based on polarization-based multiplexing in a communication network.

According to a first exemplary embodiment of the present disclosure, a method of a first communication node may comprise: generating a first polarized signal by performing first baseband processing on a first set of modulation symbols; generating a second polarized signal by multiplying the first polarized signal by a first conversion matrix; and transmitting the second polarized signal to a second communication node.

When a first polarization scheme used by the first communication node is different from a second polarization scheme used by the second communication node, a polarization conversion operation using the first conversion matrix may be performed.

The method may further comprise: receiving, from the second communication node, information of a second polarization scheme used by the second communication node.

A polarization scheme for each of the first polarized signal and the second polarized signal may be one of linear polarization (LP), horizontal polarization, vertical polarization, circular polarization (CP), left-handed circular polarization (LHCP), right-handed circular polarization (RHCP), cross polarization (XP), +45 degree polarization, or −45 degree polarization.

The method may further comprise: generating a third polarized signal by multiplying the first polarized signal by a second conversion matrix; and transmitting the third polarized signal to the second communication node, wherein the second polarized signal and the third polarized signal have different polarization schemes.

The method may further comprise: generating a fourth polarized signal by performing second baseband processing on a second set of modulation symbols; generating a fifth polarized signal by multiplying the fourth polarized signal by a third conversion matrix; and transmitting the fifth polarized signal to the second communication node, wherein the second polarized signal and the fifth polarized signal have different polarization schemes, and the first set of modulation symbols and the second set of modulation symbols are sets of modulation symbols for different physical channels, different physical signals, or different resource elements.

When a first polarization scheme of the first polarized signal is LP and a second polarization scheme of the second polarized signal is XP, the first conversion matrix may include $C_{LPXP}$, and $C_{LPXP}$ may be $$\frac{1}{\sqrt{2}}\begin{bmatrix} 1 & 1 \\ -1 & 1 \end{bmatrix}.$$

When a first polarization scheme of the first polarized signal is LP and a second polarization scheme of the second polarized signal is CP, the first conversion matrix may include $C_{LPCP}$, and $C_{LPCP}$ may be $$\frac{1}{\sqrt{2}}\begin{bmatrix} 1 & -j \\ 1 & j \end{bmatrix}.$$

When a first polarization scheme of the first polarized signal is XP and a second polarization scheme of the second polarized signal is LP, the first conversion matrix may include $C_{XPLP}$, and the $C_{XPLP}$ may be $$\frac{1}{\sqrt{2}}\begin{bmatrix} 1 & -1 \\ 1 & 1 \end{bmatrix}.$$

When a first polarization scheme of the first polarized signal is XP and a second polarization scheme of the second polarized signal is CP, the first conversion matrix may include $C_{XPCP}$, and the $C_{XPCP}$ may be $$\frac{1}{2}\begin{bmatrix} 1-j & -1-j \\ 1+j & -1+j \end{bmatrix}.$$

When a first polarization scheme of the first polarized signal is CP and a second polarization scheme of the second polarized signal is LP, the first conversion matrix may include $C_{CPLP}$, and the $C_{CPLP}$ may be $$\frac{1}{\sqrt{2}}\begin{bmatrix} 1 & 1 \\ j & -j \end{bmatrix}.$$

When a first polarization scheme of the first polarized signal is CP and a second polarization scheme of the second polarized signal is XP, the first conversion matrix may include $C_{CPXP}$, and the $C_{CPXP}$ may be $$\frac{1}{2}\begin{bmatrix} 1+j & 1-j \\ -1+j & -1-j \end{bmatrix}.$$

According to a second exemplary embodiment of the present disclosure, a method of a second communication node may comprise: receiving a first polarized signal from a first communication node; generating a second polarized signal by multiplying the first polarized signal by a first conversion matrix; and generating a first set of modulation symbols by performing first baseband processing on the second polarized signal.

When a first polarization scheme used by the first communication node is different from a second polarization scheme used by the second communication node, a polarization conversion operation using the first conversion matrix may be performed.

A polarization scheme for each of the first polarized signal and the second polarized signal may be one of linear polarization (LP), horizontal polarization, vertical polarization, circular polarization (CP), left-handed circular polarization (LHCP), right-handed circular polarization (RHCP), cross polarization (XP), +45 degree polarization, or −45 degree polarization.

The method may further comprise: receiving a third polarized signal from the first communication node; and generating the second polarized signal by multiplying the third polarized signal by a second conversion matrix, wherein the first polarized signal and the third polarized signal have different polarization schemes.

The method may further comprise: receiving a fourth polarized signal from the first communication node; generating a fifth polarized signal by multiplying the fourth polarized signal by a third conversion matrix; and generating a second set of modulation symbols by performing second baseband processing on the fifth polarized signal, wherein the first polarized signal and the fourth polarized signal have different polarization schemes, and the first set of modulation symbols and the second set of modulation symbols are sets of modulation symbols for different physical channels, different physical signals, or different resource elements.

According to a third exemplary embodiment of the present disclosure, a first communication node may comprise at least one processor, wherein the at least one processor may cause the first communication node to perform: generating a first polarized signal by performing first baseband processing on a first set of modulation symbols; generating a second polarized signal by multiplying the first polarized signal by a first conversion matrix; and transmitting the second polarized signal to a second communication node.

The at least one processor may further cause the first communication node to perform: generating a third polarized signal by multiplying the first polarized signal by a second conversion matrix; and transmitting the third polarized signal to the second communication node, wherein the second polarized signal and the third polarized signal have different polarization schemes.

The at least one processor may further cause the first communication node to perform: generating a fourth polarized signal by performing second baseband processing on a second set of modulation symbols; generating a fifth polarized signal by multiplying the fourth polarized signal by a third conversion matrix; and transmitting the fifth polarized signal to the second communication node, wherein the second polarized signal and the fifth polarized signal have different polarization schemes, and the first set of modulation symbols and the second set of modulation symbols are sets of modulation symbols for different physical channels, different physical signals, or different resource elements.

According to the present disclosure, a transmitting node can multiply a baseband signal by a conversion matrix to generate a polarized signal with a different polarization scheme from the baseband signal and transmit the polarized signal using an antenna. The transmitting node can transmit polarized signals with different polarization schemes using a single antenna. A receiving node can receive polarized signals with different polarization schemes through a single antenna and generate a baseband signal by multiplying each polarized signal by a conversion matrix. Through these operations, polarized signals with different polarization schemes can be easily transmitted and received using a single antenna, enabling the implementation of a transmission and reception method based on polarization multiplexing. Consequently, resource efficiency can be enhanced, contributing to the overall improvement of the communication network's performance.

DETAILED DESCRIPTION OF THE EMBODIMENTS

Figure 1:
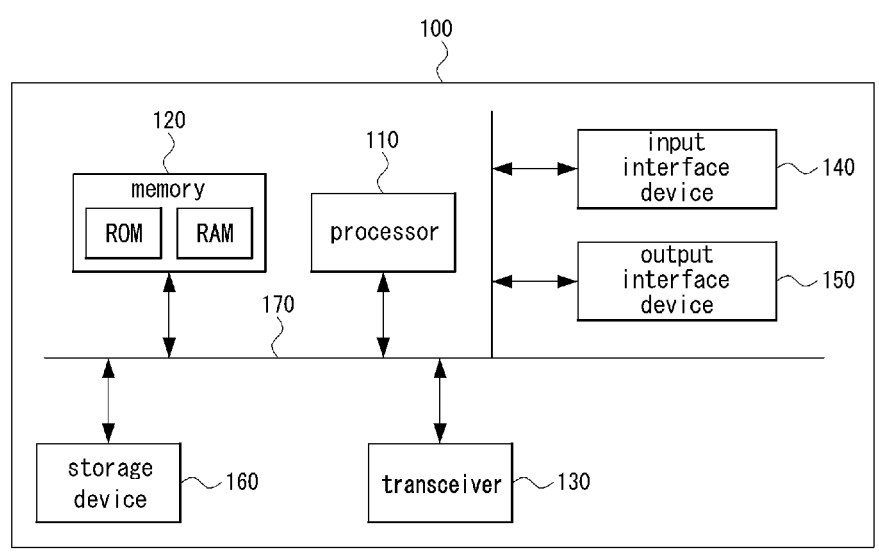
FIG. 1 is a block diagram illustrating a first exemplary embodiment of a communication node in a communication network.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e. "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g. Long-Term Evolution (LTE) communication system or LTE-A communication system), the 5G communication system (e.g. New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication network may include a terrestrial network and a non-terrestrial network. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

In exemplary embodiments, "an operation (e.g. transmission operation) is configured" may mean that "configuration information (e.g. information element(s) or parameter(s)) for the operation and/or information indicating to perform the operation is signaled". "Information element(s) (e.g. parameter(s)) are configured" may mean that "corresponding information element(s) are signaled". In other words, "an operation (e.g. transmission operation) is configured in a communication node" may mean that the communication node receives "configuration information (e.g. information elements, parameters) for the operation" and/or "information indicating to perform the operation". "An information element (e.g. parameter) is configured in a communication node" may mean that "the information element is signaled to the communication node (e.g. the communication node receives the information element)".

The signaling may be at least one of system information (SI) signaling (e.g. transmission of system information block (SIB) and/or master information block (MIB)), RRC signaling (e.g. transmission of RRC parameters and/or higher layer parameters), MAC control element (CE) signaling, or PHY signaling (e.g. transmission of downlink control information (DCI), uplink control information (UCI), and/or sidelink control information (SCI)). A signaling message may be at least one of an SI signaling message (e.g. SI message), an RRC signaling message (e.g. RRC message), a MAC CE signaling message (e.g. MAC CE message or MAC message), or a PHY signaling message (e.g. PHY message).

Hereinafter, even when a method (e.g. transmission or reception of a signal) performed at a first communication node among communication nodes is described, a corresponding second communication node may perform a method (e.g. reception or transmission of the signal) corresponding to the method performed at the first communication node. That is, when an operation of a terminal is described, a base station corresponding to the terminal may perform an operation corresponding to the operation of the terminal. Conversely, when an operation of a base station is described, a terminal corresponding to the base station may perform an operation corresponding to the operation of the base station. In addition, when an operation of a first terminal is described, a second terminal corresponding to the first terminal may perform an operation corresponding to the operation of the first terminal. Conversely, when an operation of a second terminal is described, a first terminal corresponding to the second terminal may perform an operation corresponding to the operation of the second terminal.

FIG. 1 is a block diagram illustrating a first exemplary embodiment of a communication node in a communication network.

Referring to FIG. 1, a communication node 100 may comprise at least one processor 110, a memory 120, and a transceiver 130 connected to the network for performing communications. Also, the communication node 100 may further comprise an input interface device 140, an output interface device 150, a storage device 160, and the like. Each component included in the communication node 100 may communicate with each other as connected through a bus 170.

However, each component included in the communication node 100 may not be connected to the common bus 170 but may be connected to the processor 110 via an individual interface or a separate bus. For example, the processor 110 may be connected to at least one of the memory 120, the transceiver 130, the input interface device 140, the output interface device 150 and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM).

Figure 2:
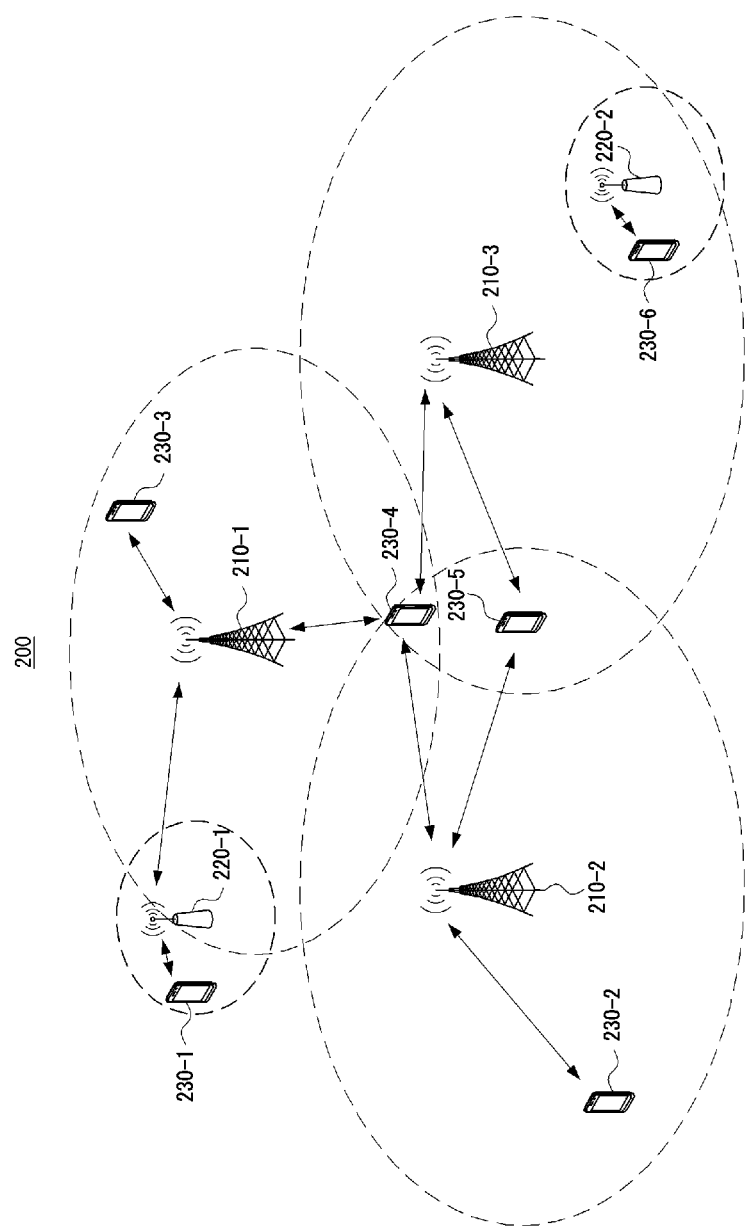
FIG. 2 is a conceptual diagram illustrating a first exemplary embodiment of a communication network.

FIG. 2 is a conceptual diagram illustrating a first exemplary embodiment of a communication network.

Referring to FIG. 2, a communication network 200 may be a terrestrial network. The communication system 200 may comprise a plurality of communication nodes 210-1, 210-2, 210-3, 220-1, 220-2, 230-1, 230-2, 230-3, 230-4, 230-5, and 230-6. In addition, the communication system 200 may further comprise a core network (e.g. a serving gateway (S-GW), a packet data network (PDN) gateway (P-GW), and a mobility management entity (MME)). When the communication system 200 is a 5G communication system (e.g. new radio (NR) system), the core network may include an access and mobility management function (AMF), a user plane function (UPF), a session management function (SMF), and the like.

The plurality of communication nodes 210 to 230 may support a communication protocol defined by the 3rd generation partnership project (3GPP) specifications (e.g. LTE communication protocol, LTE-A communication protocol, NR communication protocol, or the like). The plurality of communication nodes 210 to 230 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like.

The communication system 200 may comprise a plurality of base stations 210-1, 210-2, 210-3, 220-1, and 220-2, and a plurality of terminals 230-1, 230-2, 230-3, 230-4, 230-5, and 230-6. Each of the first base station 210-1, the second base station 210-2, and the third base station 210-3 may form a macro cell, and each of the fourth base station 220-1 and the fifth base station 220-2 may form a small cell. The fourth base station 220-1, the third terminal 230-3, and the fourth terminal 230-4 may belong to cell coverage of the first base station 210-1. Also, the second terminal 230-2, the fourth terminal 230-4, and the fifth terminal 230-5 may belong to cell coverage of the second base station 210-2. Also, the fifth base station 220-2, the fourth terminal 230-4, the fifth terminal 230-5, and the sixth terminal 230-6 may belong to cell coverage of the third base station 210-3. Also, the first terminal 230-1 may belong to cell coverage of the fourth base station 220-1, and the sixth terminal 230-6 may belong to cell coverage of the fifth base station 220-2.

Here, each of the plurality of base stations 210-1, 210-2, 210-3, 220-1, and 220-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

In the present disclosure, the base station may be a conventional base station (e.g. terrestrial base station) or a satellite base station. The base station may be interpreted as a terrestrial base station or a satellite base station depending on a context. The terrestrial base station may refer to a base station located on the ground. The satellite base station may refer to a base station located on a satellite (e.g. non-terrestrial base station). The satellite base station may be referred to as a non-terrestrial base station or a mobile base station. A satellite may be classified into a transparent satellite and a regenerative satellite. The transparent satellite may perform functions of a repeater for a base station. The regenerative satellite may perform functions of a base station. The satellite may be a low earth orbit (LEO) satellite, a medium earth orbit (MEO) satellite, or a geostationary equatorial orbit (GEO) satellite. Further, a high-altitude platform station system (HAPS) may be interpreted as a type of satellite. Additionally, a satellite may be interpreted as a type of unmanned aerial vehicle (UAV).

Each of the plurality of terminals 230-1, 230-2, 230-3, 230-4, 230-5, and 230-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Each of the plurality of base stations 210-1, 210-2, 210-3, 220-1, and 220-2 may operate in the same frequency band or in different frequency bands. The plurality of base stations 210-1, 210-2, 210-3, 220-1, and 220-2 may be connected to each other via an ideal backhaul or a non-ideal backhaul, and exchange information with each other via the ideal or non-ideal backhaul. Also, each of the plurality of base stations 210-1, 210-2, 210-3, 220-1, and 220-2 may be connected to the core network through the ideal or non-ideal backhaul.

Each of the plurality of base stations 210-1, 210-2, 210-3, 220-1, and 220-2 may transmit a signal received from the core network to the corresponding terminal 230-1, 230-2, 230-3, 230-4, 230-5, or 230-6, and transmit a signal received from the corresponding terminal 230-1, 230-2, 230-3, 230-4, 230-5, or 230-6 to the core network.

In addition, each of the plurality of base stations 210-1, 210-2, 210-3, 220-1, and 220-2 may support a multi-input multi-output (MIMO) transmission (e.g. a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 230-1, 230-2, 230-3, 230-4, 230-5, and 230-6 may perform operations corresponding to the operations of the plurality of base stations 210-1, 210-2, 210-3, 220-1, and 220-2 (i.e. the operations supported by the plurality of base stations 210-1, 210-2, 210-3, 220-1, and 220-2). For example, the second base station 210-2 may transmit a signal to the fourth terminal 230-4 in the SU-MIMO manner, and the fourth terminal 230-4 may receive the signal from the second base station 210-2 in the SU-MIMO manner. Alternatively, the second base station 210-2 may transmit a signal to the fourth terminal 230-4 and fifth terminal 230-5 in the MU-MIMO manner, and the fourth terminal 230-4 and fifth terminal 230-5 may receive the signal from the second base station 210-2 in the MU-MIMO manner.

The first base station 210-1, the second base station 210-2, and the third base station 210-3 may transmit a signal to the fourth terminal 230-4 in the COMP transmission manner, and the fourth terminal 230-4 may receive the signal from the first base station 210-1, the second base station 210-2, and the third base station 210-3 in the COMP manner. Also, each of the plurality of base stations 210-1, 210-2, 210-3, 220-1, and 220-2 may exchange signals with the corresponding terminals 230-1, 230-2, 230-3, 230-4, 230-5, or 230-6 which belongs to its cell coverage in the CA manner. Each of the base stations 210-1, 210-2, and 210-3 may control D2D communications between the fourth terminal 230-4 and the fifth terminal 230-5, and thus the fourth terminal 230-4 and the fifth terminal 230-5 may perform the D2D communications under control of the second base station 210-2 and the third base station 210-3.

Figure 3:
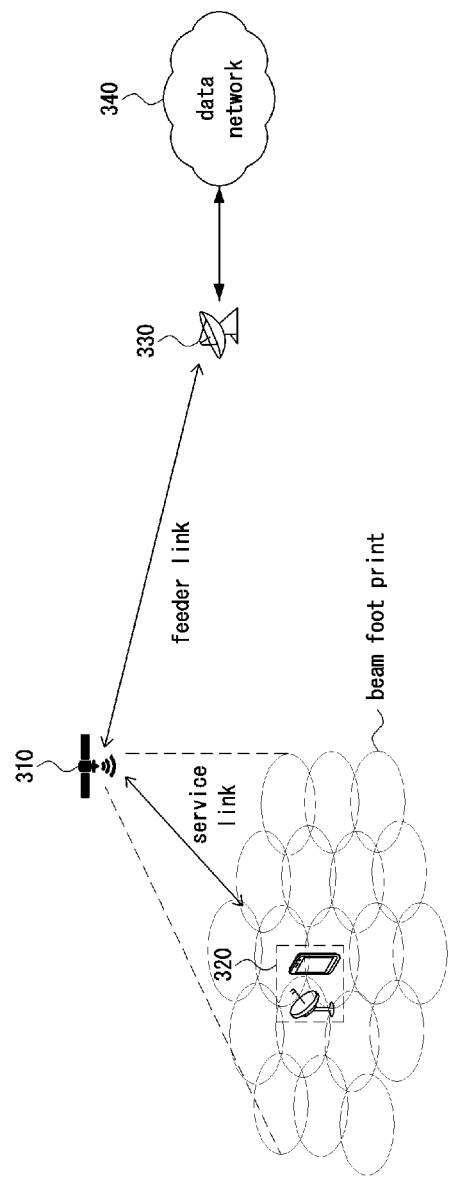
FIG. 3 is a conceptual diagram illustrating a second exemplary embodiment of a communication network.

FIG. 3 is a conceptual diagram illustrating a second exemplary embodiment of a communication network.

Referring to FIG. 3, a communication network may be a non-terrestrial network (NTN). The NTN may include a satellite 310, a communication node 320, a gateway 330, a data network 340, and the like. The NTN shown in FIG. 3 may be an NTN based on a transparent payload. The satellite 310 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 320 may include a communication node (e.g. a user equipment (UE) or a terminal) located on a terrestrial site and a communication node (e.g. an airplane, a drone) located on a non-terrestrial space. A service link may be established between the satellite 310 and the communication node 320, and the service link may be a radio link. The satellite 310 may provide communication services to the communication node 320 using one or more beams. The shape of a footprint of the beam of the satellite 310 may be elliptical.

The communication node 320 may perform communications (e.g. downlink communication and uplink communication) with the satellite 310 using LTE technology and/or NR technology. The communications between the satellite 310 and the communication node 320 may be performed using an NR-Uu interface. When dual connectivity (DC) is supported, the communication node 320 may be connected to other base stations (e.g. base stations supporting LTE and/or NR functionality) as well as the satellite 310, and perform DC operations based on the techniques defined in the LTE and/or NR specifications.

The gateway 330 may be located on a terrestrial site, and a feeder link may be established between the satellite 310 and the gateway 330. The feeder link may be a radio link. The gateway 330 may be referred to as a 'non-terrestrial network (NTN) gateway'. The communications between the satellite 310 and the gateway 330 may be performed based on an NR-Uu interface or a satellite radio interface (SRI). The gateway 330 may be connected to the data network 340. There may be a 'core network' between the gateway 330 and the data network 340. In this case, the gateway 330 may be connected to the core network, and the core network may be connected to the data network 340. The core network may support the NR technology. For example, the core network may include an access and mobility management function (AMF), a user plane function (UPF), a session management function (SMF), and the like. The communications between the gateway 330 and the core network may be performed based on an NG-C/U interface.

Alternatively, a base station and the core network may exist between the gateway 330 and the data network 340. In this case, the gateway 330 may be connected with the base station, the base station may be connected with the core network, and the core network may be connected with the data network 340. The base station and core network may support the NR technology. The communications between the gateway 330 and the base station may be performed based on an NR-Uu interface, and the communications between the base station and the core network (e.g. AMF, UPF, SMF, and the like) may be performed based on an NG-C/U interface.

Figure 4:
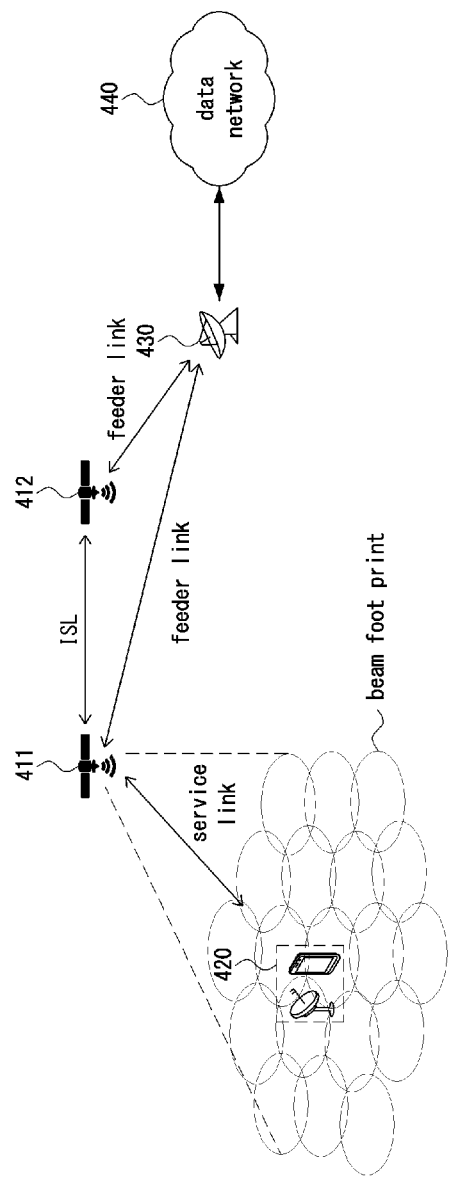
FIG. 4 is a conceptual diagram illustrating a third exemplary embodiment of a communication network.

FIG. 4 is a conceptual diagram illustrating a third exemplary embodiment of a communication network.

Referring to FIG. 4, a communication network may be an NTN. The NTN may include a first satellite 411, a second satellite 412, a communication node 420, a gateway 430, a data network 440, and the like. The NTN shown in FIG. 4 may be a regenerative payload based NTN. For example, each of the satellites 411 and 412 may perform a regenerative operation (e.g. demodulation, decoding, re-encoding, re-modulation, and/or filtering operation) on a payload received from other entities (e.g. the communication node 420 or the gateway 430), and transmit the regenerated payload.

Each of the satellites 411 and 412 may be a LEO satellite, a MEO satellite, a GEO satellite, a HEO satellite, or a UAS platform. The UAS platform may include a HAPS. The satellite 411 may be connected to the satellite 412, and an inter-satellite link (ISL) may be established between the satellite 411 and the satellite 412. The ISL may operate in an RF frequency band or an optical band. The ISL may be established optionally. The communication node 420 may include a terrestrial communication node (e.g. UE or terminal) and a non-terrestrial communication node (e.g. airplane or drone). A service link (e.g. radio link) may be established between the satellite 411 and communication node 420. The satellite 411 may provide communication services to the communication node 420 using one or more beams.

The communication node 420 may perform communications (e.g. downlink communication or uplink communication) with the satellite 411 using LTE technology and/or NR technology. The communications between the satellite 411 and the communication node 420 may be performed using an NR-Uu interface. When DC is supported, the communication node 420 may be connected to other base stations (e.g. base stations supporting LTE and/or NR functionality) as well as the satellite 411, and may perform DC operations based on the techniques defined in the LTE and/or NR specifications.

The gateway 430 may be located on a terrestrial site, a feeder link may be established between the satellite 411 and the gateway 430, and a feeder link may be established between the satellite 412 and the gateway 430. The feeder link may be a radio link. When the ISL is not established between the satellite 411 and the satellite 412, the feeder link between the satellite 411 and the gateway 430 may be established mandatorily.

The communications between each of the satellites 411 and 412 and the gateway 430 may be performed based on an NR-Uu interface or an SRI. The gateway 430 may be connected to the data network 440. There may be a core network between the gateway 430 and the data network 440. In this case, the gateway 430 may be connected to the core network, and the core network may be connected to the data network 440. The core network may support the NR technology. For example, the core network may include AMF, UPF, SMF, and the like. The communications between the gateway 430 and the core network may be performed based on an NG-C/U interface.

Alternatively, a base station and the core network may exist between the gateway 430 and the data network 440. In this case, the gateway 430 may be connected with the base station, the base station may be connected with the core network, and the core network may be connected with the data network 440. The base station and the core network may support the NR technology. The communications between the gateway 430 and the base station may be performed based on an NR-Uu interface, and the communications between the base station and the core network (e.g. AMF, UPF, SMF, and the like) may be performed based on an NG-C/U interface.

NTN reference scenarios may be defined as shown in Table 1 below.

TABLE 1

|  | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 310 in the NTN shown in FIG. 3 is a GEO satellite (e.g. a GEO satellite that supports a transparent function), this may be referred to as 'scenario A'. When the satellites 411 and 412 in the NTN shown in FIG. 4 are GEO satellites (e.g. GEOs that support a regenerative function), this may be referred to as 'scenario B'.

When the satellite 310 in the NTN shown in FIG. 3 is an LEO satellite with steerable beams, this may be referred to as 'scenario C1'. When the satellite 310 in the NTN shown in FIG. 3 is an LEO satellite having beams moving with the satellite, this may be referred to as 'scenario C2'. When the satellites 411 and 412 in the NTN shown in FIG. 4 are LEO satellites with steerable beams, this may be referred to as 'scenario D1'. When the satellites 411 and 412 in the NTN shown in FIG. 4 are LEO satellites having beams moving with the satellites, this may be referred to as 'scenario D2'.

Parameters for the scenarios defined in Table 1 may be defined as shown in Table 2 below.

TABLE 2

|  | Scenarios A and B | Scenarios C and D |
|---|---|---|
| Altitude | 35,786 km | 600 km |
|  |  | 1,200 km |
| Spectrum (service link) |  | <6 GHz (e.g. 2 GHz) |
|  |  | >6 GHz (e.g. DL 20 GHz, UL 30 GHz) |
| Maximum channel bandwidth capability (service link) |  | 30 MHz for band <6 GHz |
|  |  | 1 GHz for band >6 GHz |
| Maximum distance between satellite and communication node (e.g. UE) at the minimum elevation angle | 40,581 km | 1,932 km (altitude of 600 km) |
|  |  | 3,131 km (altitude of 1,200 km) |

TABLE 2-continued

|  | Scenarios A and B | Scenarios C and D |
|---|---|---|
| Maximum round trip delay (RTD) (only propagation delay) | Scenario A: 541.46 ms (service and feeder links) Scenario B: 270.73 ms (only service link) | Scenario C: (transparent payload: service and feeder links) −5.77 ms (altitude of 60 0 km) −41.77 ms (altitude of 1,200 km) Scenario D: (regenerative payload: only service link) −12.89 ms (altitude of 600 km) −20.89 ms (altitude of 1,200 km) |
| Maximum delay variation within a single beam | 16 ms | 4.44 ms (altitude of 600 km) 6.44 ms (altitude of 1,200 km) |
| Maximum differential delay within a cell | 10.3 ms | 3.12 ms (altitude of 600 km) 3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

|  | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

In a non-terrestrial network, a base station may transmit system information (e.g. SIB19) including satellite assistance information for NTN access. A UE may receive the system information (e.g. SIB19) from the base station, identify the satellite assistance information included in the system information, and perform communication (e.g. non-terrestrial communication) based on the satellite assistance information. The SIB19 may include information element(s) defined in Table 4 below.

TABLE 4

```
SIB19-r17 ::= SEQUENCE {
    ntn-Config-r17              NTN-Config-r17
    t-Service-r17               INTEGER(0..549755813887)
    referenceLocation-r17       ReferenceLocation-r17
    distanceThresh-r17          INTEGER(0..65525)
    ntn-NeighCellConfigList-r17         NTN-NeighCellConfigList-r17
    lateNonCriticalExtension    OCTET STRING
    ...,
    [[
    ntn-NeighCellConfigListExt-v1720    NTN-NeighCellConfigList-r17
    ]]
}
NTN-NeighCellConfigList-r17 ::=         SEQUENCE (SIZE(1..maxCellNTN-r17)) OF
NTN-NeighCellConfig-r17
NTN-NeighCellConfig-r17 ::=             SEQUENCE {
    ntn-Config-r17              NTN-Config-r17
    carrierFreq-r17             ARFCN-ValueNR
    physCellId-r17              PhysCellId
}
```

NTN-Config defined in Table 4 may include information element(s) defined in Table 5 below.

TABLE 5

```
NTN-Config-r17 ::=                SEQUENCE {
   epochTime-r17                      EpochTime-r17
   ntn-UlSyncValidityDuration-r17 ENUMERATED{ s5, s10, s15, s20, s25, s30, s35, s40,
s45, s50, s55, s60, s120, s180, s240, s900}
   cellSpecificKoffset-r17             INTEGER(1..1023)
   kmac-r17                            INTEGER(1..512)
   ta-Info-r17                         TA-Info-r17
   ntn-PolarizationDL-r17              ENUMERATED {rhcp,lhcp,linear}
   ntn-PolarizationUL-r17              ENUMERATED {rhcp,lhcp,linear}
   ephemerisInfo-r17                   EphemerisInfo-r17
   ta-Report-r17                       ENUMERATED {enabled}
   ...
}
EpochTime-r17 ::=                 SEQUENCE {
   sfn-r17                        INTEGER(0..1023),
   subFrameNR-r17                      INTEGER(0..9)
}
TA-Info-r17 ::=                   SEQUENCE {
   ta-Common-r17                       INTEGER(0..66485757),
   ta-CommonDrift-r17                    INTEGER(-257303..257303)
   ta-CommonDriftVariant-r17           INTEGER(0..28949)
}
```

EphemerisInfo defined in Table 5 may include information element(s) defined in Table 6 below.

TABLE 6

```
EphemerisInfo-r17 ::=             CHOICE {
   positionVelocity-r17              PositionVelocity-r17,
   orbital-r17                     Orbital-r17
}
PositionVelocity-r17 ::=          SEQUENCE
   positionX-r17                     PositionStateVector-r17,
   positionY-r17                     PositionStateVector-r17,
   positionZ-r17                     PositionStateVector-r17,
   velocityVX-r17                    VelocityStateVector-r17,
   velocityVY-r17                    VelocityStateVector-r17,
   velocityVZ-r17                    VelocityStateVector-r17
}
Orbital-r17 ::=                   SEQUENCE {
   semiMajorAxis-r17                 INTEGER (0..8589934591),
   eccentricity-r17                  INTEGER (0..1048575),
   periapsis-r17                     INTEGER (0..268435455),
   longitude-r17                     INTEGER (0..268435455),
   inclination-r17                   INTEGER (-67108864..67108863),
   meanAnomaly-r17                   INTEGER (0..268435455)
}
PositionStateVector-r17 ::= INTEGER (-33554432..33554431)
VelocityStateVector-r17 ::= INTEGER (-131072..131071)
```

Figure 5:
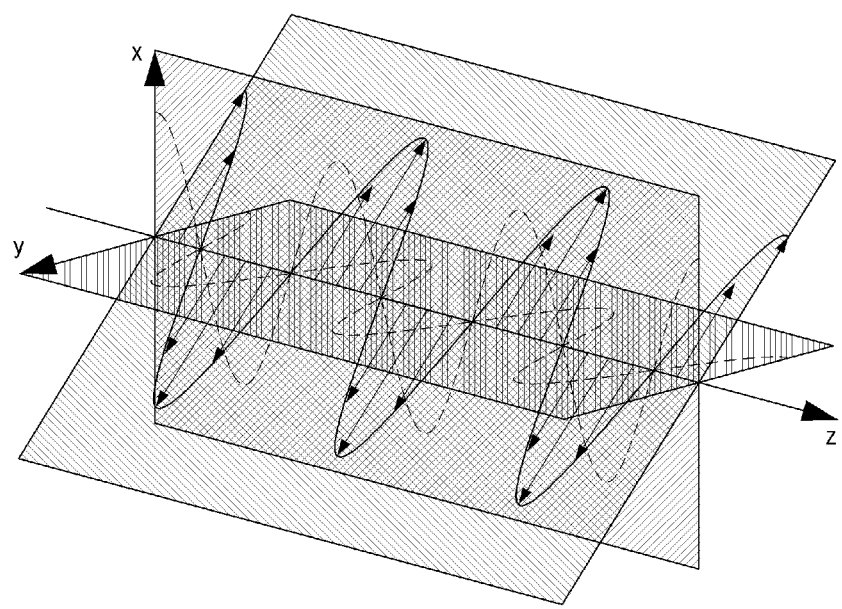
FIG. 5 is a conceptual diagram illustrating polarizations.

FIG. 5 is a conceptual diagram illustrating polarizations.

Referring to FIG. 5, linear polarization (LP), cross polarization (XP), and/or circular polarization (CP) may be considered. The LP may include horizontal polarization and vertical polarization. The horizontal polarization may be a polarization having 0 degree (e.g. 0 degree polarization). The vertical polarization may be a polarization having 90 degree (e.g. 90 degree polarization). The XP may be a polarization having +45 degree (e.g. +45 degree polarization) and a polarization having −45 degree (e.g. −45 degree polarization). The CP may include left-handed circular polarization (LHCP) and right-handed circular polarization (RHCP). The LHCP may be a counter clockwise polarization. The RHCP may be a clockwise polarization.

An aerial platform may perform communication using a CP, and a terrestrial platform may perform communication using an LP or XP. The aerial platform may refer to a non-terrestrial communication node. The non-terrestrial communication node may be a satellite base station, UAV, or the like. The terrestrial platform may refer to a terrestrial communication node. The terrestrial communication node may be a terrestrial base station, gateway, terminal, or the like. The base station may refer to a network (e.g. network entity). A polarization mismatch may occur if a polarization (e.g. CP) used in a non-terrestrial communication node is different from a polarization (e.g. XP or LP) used in a terrestrial communication node. In this case, communication performance may deteriorate. To solve the above problem, compensation for polarization may be performed. If compensation for polarization is performed, communication performance can be improved. The polarization compensation may be performed at a transmitting node and/or a receiving node.

A polarization diversity scheme may be considered to improve coverage in a non-terrestrial network. For example, a communication node may transmit the same signal repeatedly using various polarizations. In this case, communication coverage can be improved through multiple versions of the same signal (e.g. signals transmitted using different polarizations). The conventional polarization may be implemented at a radio frequency (RF) level, and separate RF antennas may be required for polarization diversity. In other words, a communication node may include a plurality of RF antennas to support polarization diversity transmission. However, using separate RF antennas for polarization diversity may be inefficient.

Figure 6:
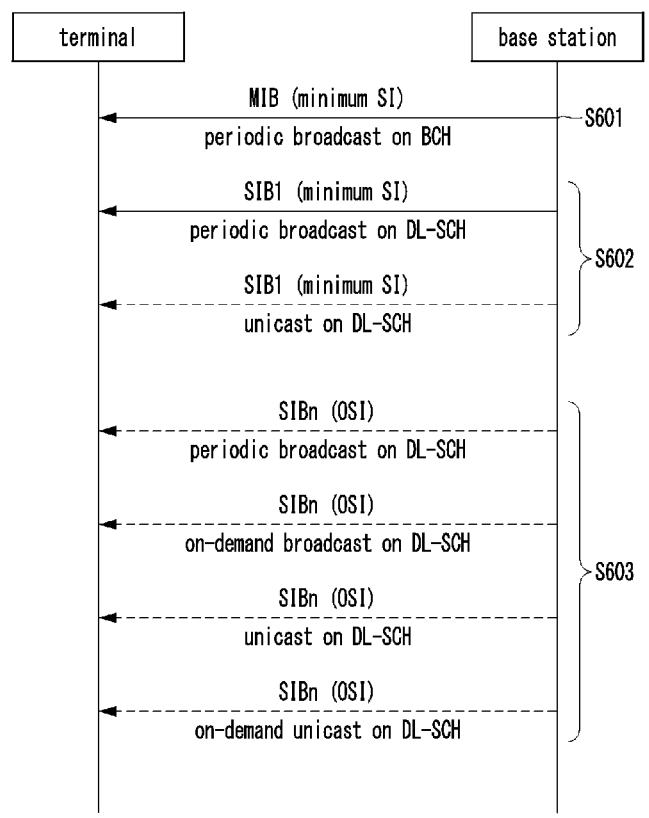
FIG. 6 is a sequence chart illustrating a first exemplary embodiment of a method for transmitting and receiving system information.

FIG. 6 is a sequence chart illustrating a first exemplary embodiment of a method for transmitting and receiving system information.

Referring to FIG. 6, a base station may transmit a master information block (MIB) to a terminal (S601). The terminal may receive the MIB from the base station and identify information element(s) included in the MIB. The MIB may be transmitted on a broadcast channel (BCH). The MIB may be transmitted periodically according to a broadcast manner. The base station may transmit an SIB1 to the terminal (S602). The terminal may receive the SIB1 from the base station and identify information element(s) included in the SIB1. The SIB1 may be transmitted on a downlink (DL)-shared channel (SCH). The SIB1 may be transmitted periodically according to a broadcast manner. Alternatively, the SIB1 may be transmitted according to a unicast manner.

The base station may transmit other system information (OSI) to the terminal (S603). The terminal may receive the OSI from the base station and identify information element(s) included in the OSI. The OSI may be an SIBn. n may be a natural number of 2 or more. For example, the OSI may be one or more SIBs among SIB2 to SIB21. The OSI may be transmitted on a DL-SCH. The OSI may be transmitted periodically according to a broadcast manner. Alternatively, the OSI may be transmitted according to a unicast manner. Alternatively, the OSI may be transmitted according to an on-demand broadcast manner or an on-demand unicast manner. In the on-demand broadcast manner, the OSI may be transmitted in a broadcast manner according to a request of the terminal. In the on-demand unicast manner, the OSI may be transmitted in a unicast manner according to a request of the terminal.

The terminal may attempt to access the non-terrestrial network (e.g. non-terrestrial base station). In other words, the terminal may perform an initial access procedure for the non-terrestrial network. In this case, the base station (e.g. non-terrestrial base station) may transmit an SIB19 to the terminal. The terminal may receive the SIB19 from the base station and identify information element(s) included in the SIB19. The SIB19 may include the information element(s) defined in Table 4. For example, the SIB19 may include NTN-Config, and NTN-Config may include the information element(s) defined in Table 5. NTN-Config may include ntn-PolarizationDL and ntn-PolarizationUL. ntn-PolarizationDL may indicate a DL polarization scheme. The DL polarization scheme may be indicated as RHCP, LHCP, or LP. ntn-PolarizationUL may indicate a UL polarization scheme. The UL polarization scheme may be indicated as RHCP, LHCP, or LP. The DL polarization scheme may be a polarization scheme used for DL communication. The UL polarization scheme may be a polarization scheme used for UL communication.

In the access procedure (e.g. initial access procedure) between the terminal and the non-terrestrial network, the base station may inform the terminal of the DL polarization scheme and/or the UL polarization scheme. One polarization scheme may be configured to the terminal as the DL polarization scheme. One polarization scheme may be configured to the terminal as the UL polarization scheme. The SIB19 may indicate one polarization scheme (e.g. one DL polarization scheme and/or one UL polarization scheme) for each link.

Meanwhile, measurement configuration information may include an information element indicating a polarization scheme. For example, the base station may transmit MeasConfig to the terminal. The terminal may identify information element(s) included in MeasConfig. MeasConfig may include MeasObjectNR. MeasObjectNR may include information element(s) defined in Tables 7 to 14 below.

TABLE 7

```
MeasObjectNR ::=                       SEQUENCE {
    ssbFrequency                                            ARFCN-ValueNR
    OPTIONAL, -- Cond SSBorAssociatedSSB
    ssbSubcarrierSpacing                                    SubcarrierSpacing
    OPTIONAL, -- Cond SSBorAssociatedSSB
    smtc1                              SSB-MTC              OPTIONAL, --
    Cond SSBorAssociatedSSB
    smtc2                              SSB-MTC2             OPTIONAL, --
    Cond IntraFreqConnected
    refFreqCSI-RS                                           ARFCN-ValueNR
    OPTIONAL, -- Cond CSI-RS
    referenceSignalConfig              ReferenceSignalConfig,
    absThreshSS-BlocksConsolidation                         ThresholdNR
    OPTIONAL, -- Need R
    absThreshCSI-RS-Consolidation                           ThresholdNR
    OPTIONAL, -- Need R
    nrofSS-BlocksToAverage                INTEGER (2..maxNrofSS-BlocksToAverage)
    OPTIONAL, -- Need R
    nrofCSI-RS-ResourcesToAverage         INTEGER (2..maxNrofCSI-RS-
    ResourcesToAverage)                OPTIONAL, -- Need R
    quantityConfigIndex                INTEGER (1..maxNrofQuantityConfig),
```

TABLE 8

```
    offsetMO                           Q-OffsetRangeList,
    cellsToRemoveList                  PCI-List             OPTIONAL, -
    - Need N
    cellsToAddModList                                       CellsToAddModList
    OPTIONAL, -- Need N
    excludedCellsToRemoveList                               PCI-RangeIndexList
    OPTIONAL, -- Need N
    excludedCellsToAddModList             SEQUENCE (SIZE (1..maxNrofPCI-Ranges)) OF
    PCI-RangeElement                   OPTIONAL, -- Need N
    allowedCellsToRemoveList                                PCI-RangeIndexList
    OPTIONAL, -- Need N
    allowedCellsToAddModList              SEQUENCE (SIZE (1..maxNrofPCI-Ranges)) OF
    PCI-RangeElement                   OPTIONAL, -- Need N
    ...,
    [[
```

TABLE 8-continued

| | | |
|---|---|---|
| freqBandIndicatorNR | FreqBandIndicatorNR | |
| OPTIONAL, -- Need R | | |
| measCycleSCell | ENUMERATED {sf160, sf256, sf320, sf512, sf640, sf1024, | |
| sf1280} OPTIONAL -- Need R | | |
| ]], | | |
| [[ | | |
| smtc3list-r16 | SSB-MTC3List-r16 | OPTIONAL, |
| -- Need R | | |
| rmtc-Config-r16 | SetupRelease {RMTC-Config-r16} | |
| OPTIONAL, -- Need M | | |
| t312-r16 | SetupRelease { T312-r16 } | OPTIONAL |
| -- Need M | | |
| ]], | | |

TABLE 9

| | | |
|---|---|---|
| [[ | | |
| associatedMeasGapSSB-r17 | MeasGapId-r17 | |
| OPTIONAL, -- Need R | | |
| associatedMeasGapCSIRS-r17 | MeasGapId-r17 | |
| OPTIONAL, -- Need R | | |
| smtc4list-r17 | SSB-MTC4List-r17 | OPTIONAL, |
| -- Need R | | |
| measCyclePSCell-r17 | ENUMERATED {ms160, ms256, ms320, ms512, ms640, | |
| ms1024, ms1280, spare1} | | |
| | OPTIONAL, -- | |
| Cond SCG | | |
| cellsToAddModListExt-v1710 | CellsToAddModListExt-v1710 | |
| OPTIONAL -- Need N | | |
| ]], | | |
| [[ | | |
| associatedMeasGapSSB2-v1720 | MeasGapId-r17 | |
| OPTIONAL, -- Cond AssociatedGapSSB | | |
| associatedMeasGapCSIRS2-v1720 | MeasGapId-r17 | |
| OPTIONAL -- Cond AssociatedGapCSIRS | | |
| ]] | | |
| } | | |

TABLE 10

| | |
|---|---|
| SSB-MTC3List-r16::= | SEQUENCE (SIZE(1..4)) OF SSB-MTC3-r16 |
| SSB-MTC4List-r17::= | SEQUENCE (SIZE(1..3)) OF SSB-MTC4-r17 |
| T312-r16 ::= | ENUMERATED { ms0, ms50, ms100, ms200, ms300, ms400, |
| ms500, ms1000} | |
| ReferenceSignalConfig::= | SEQUENCE { |
| ssb-ConfigMobility | SSB-ConfigMobility |
| OPTIONAL, -- Need M | |
| csi-rs-ResourceConfigMobility | SetupRelease { CSI-RS-ResourceConfigMobility } |
| OPTIONAL -- Need M | |
| } | |
| SSB-ConfigMobility::= | SEQUENCE { |
| ssb-ToMeasure | SetupRelease { SSB-ToMeasure } |
| OPTIONAL, -- Need M | |
| deriveSSB-IndexFromCell | BOOLEAN, |
| ss-RSSI-Measurement | SS-RSSI-Measurement |
| OPTIONAL, -- Need M | |
| ..., | |
| [[ | |
| ssb-PositionQCL-Common-r16 | SSB-PositionQCL-Relation-r16 |
| OPTIONAL, -- Cond SharedSpectrum | |
| ssb-PositionQCL-CellsToAddModList-r16 | SSB-PositionQCL-CellsToAddModList-r16 |
| OPTIONAL -- Need N | |
| ssb-PositionQCL-CellsToRemoveList-r16 | PCI-List |
| OPTIONAL -- Need N | |
| ]], | |

TABLE 11

```
[[
    deriveSSB-IndexFromCellInter-r17         ServCellIndex
OPTIONAL, -- Need R
    ssb-PositionQCL-Common-r17               SSB-PositionQCL-Relation-r17
OPTIONAL, -- Cond SharedSpectrum2
    ssb-PositionQCL-Cells-r17        SetupRelease {SSB-PositionQCL-CellList-r17}
OPTIONAL -- Need M
    ]],
    [[
    cca-CellsToAddModList-r17                         PCI-List
OPTIONAL, -- Need N
    cca-CellsToRemoveList-r17       PCI-List           OPTIONAL
-- Need N
    ]]
}
Q-OffsetRangeList ::=          SEQUENCE {
    rsrpOffsetSSB              Q-OffsetRange    DEFAULT dB0,
    rsrqOffsetSSB              Q-OffsetRange    DEFAULT dB0,
    sinrOffsetSSB              Q-OffsetRange    DEFAULT dB0,
    rsrpOffsetCSI-RS           Q-OffsetRange    DEFAULT dB0,
    rsrqOffsetCSI-RS           Q-OffsetRange    DEFAULT dB0,
    sinrOffsetCSI-RS           Q-OffsetRange    DEFAULT dB0
}
```

TABLE 12

```
ThresholdNR ::=              SEQUENCE{
    thresholdRSRP                RSRP-Range        OPTIONAL,
-- Need R
    thresholdRSRQ                RSRQ-Range        OPTIONAL,
-- Need R
    thresholdSINR                SINR-Range        OPTIONAL
-- Need R
}
CellsToAddModList ::=                SEQUENCE (SIZE (1..maxNrofCellMeas)) OF
CellsToAddMod
CellsToAddModListExt-v1710 ::=       SEQUENCE (SIZE (1..maxNrofCellMeas)) OF
CellsToAddModExt-v1710
CellsToAddMod ::=              SEQUENCE {
    physCellId                 PhysCellId,
    cellIndividualOffset       Q-OffsetRangeList
}
CellsToAddModExt-v1710 ::=     SEQUENCE {
    ntn-PolarizationDL-r17                   ENUMERATED {rhcp,lhcp,linear}
OPTIONAL, -- Need R
    ntn-PolarizationUL-r17                   ENUMERATED {rhcp,lhcp,linear}
OPTIONAL -- Need R
}
```

TABLE 13

```
RMTC-Config-r16 ::=         SEQUENCE {
    rmtc-Periodicity-r16        ENUMERATED {ms40, ms80, ms160, ms320, ms640},
    rmtc-SubframeOffset-r16                       INTEGER(0..639)
OPTIONAL, -- Need M
    measDurationSymbols-r16          ENUMERATED {sym1, sym14or12, sym28or24,
sym42or36, sym70or60},
    rmtc-Frequency-r16          ARFCN-ValueNR,
    ref-SCS-CP-r16              ENUMERATED {kHz15, kHz30, kHz60-NCP, kHz60-
ECP},
    ...,
    [[
    rmtc-Bandwidth-r17                       ENUMERATED {mhz100, mhz400, mhz800, mhz1600,
mhz2000}   OPTIONAL, -- Need R
    measDurationSymbols-v1700                ENUMERATED {sym140, sym560, sym1120}
OPTIONAL, -- Need R
    ref-SCS-CP-v1700                         ENUMERATED {kHz120, kHz480, kHz960}
OPTIONAL, -- Need R
    tci-StateInfo-r17           SEQUENCE {
        tci-StateId-r17             TCI-StateId,
```

TABLE 13-continued

| ref-ServCellId-r17 | ServCellIndex | OPTIONAL - |
| --- | --- | --- |
| - Need R | | |
| } OPTIONAL -- Need R | | |
| ]], | | |
| [[ | | |
| ref-BWPId-r17 | BWP-Id | OPTIONAL -- |
| Need R | | |
| ]] | | |
| } | | |

TABLE 14

```
SSB-PositionQCL-CellsToAddModList-r16 ::= SEQUENCE (SIZE (1..maxNrofCellMeas))
OF SSB-PositionQCL-CellsToAddMod-r16
SSB-PositionQCL-CellsToAddMod-r16 ::= SEQUENCE {
    physCellId-r16              PhysCellId,
    ssb-PositionQCL-r16             SSB-PositionQCL-Relation-r16
}
SSB-PositionQCL-CellList-r17  ::=   SEQUENCE (SIZE (1..maxNrofCellMeas)) OF SSB-
PositionQCL-Cell-r17
SSB-PositionQCL-Cell-r17                ::= SEQUENCE {
    physCellId-r17              PhysCellId,
    ssb-PositionQCL-r17             SSB-PositionQCL-Relation-r17
}
```

MeasObjectNR may include CellsToAddModExt, and CellsToAddModExt may include ntn-PolarizationDL indicating the DL polarization scheme and/or ntn-PolarizationUL indicating the UL polarization scheme. The terminal may identify ntn-PolarizationDL and/or ntn-PolarizationUL included in MeasConfig, identify the DL polarization scheme indicated by ntn-PolarizationDL, and identify the UL polarization scheme indicated by ntn-PolarizationUL.

ntn-PolarizationDL included in MeasConfig may indicate the DL polarization scheme in a cell to be measured. ntn-PolarizationUL included in MeasConfig may indicate the UL polarization scheme in the cell to be measured. In other words, the polarization scheme(s) may be configured for each cell. One polarization scheme may be configured to the terminal as a DL polarization scheme of a specific cell. One polarization scheme may be configured to the terminal as a UL polarization scheme of a specific cell.

Meanwhile, even when the same symbol is delivered to a baseband (e.g. baseband processor) for each Tx polarization scheme (e.g. DL polarization scheme or UL polarization scheme), a different Tx waveform may be generated in an actual RF (e.g. actual RF antenna). A baseband symbol (e.g. baseband signal) may be a complex number. For example, a baseband symbol s may be defined as Equation 1 below. The baseband symbol s may be generated by performing baseband processing on a modulation symbol (e.g. a set of modulation symbols). In other words, the baseband symbol s may be an output for the baseband processor. The set of modulation symbols may include one or more modulation symbols. The set of modulation symbols may be configured for each physical channel, physical signal, or resource element.

$$s = s_I + j s_Q \quad \text{[Equation 1]}$$

An RF transmission vector of the baseband signal (e.g. complex signal) may be defined as follows, and a form of the Tx waveform may be analyzed.

Linear polarization (LP) may be defined as Equation 2 below.

$$\text{Horizontal polarization (0 degree polarization): } e_H = \begin{bmatrix} 1 \\ 0 \end{bmatrix} \quad \text{[Equation 2]}$$

$$\text{Vertical polarization (90 degree polarization): } e_V = \begin{bmatrix} 0 \\ 1 \end{bmatrix}$$

Cross polarization (XP) may be defined as Equation 3 below.

$$+45 \text{ degree polarization: } e_+ = \frac{1}{\sqrt{2}} \begin{bmatrix} 1 \\ 1 \end{bmatrix} \quad \text{[Equation 3]}$$

$$-45 \text{ degree polarization: } e_- = \frac{1}{\sqrt{2}} \begin{bmatrix} -1 \\ 1 \end{bmatrix}$$

Circular polarization (CP) may be defined as Equation 4 below.

$$LHCP: e_L = \frac{1}{\sqrt{2}} \begin{bmatrix} 1 \\ j \end{bmatrix} \quad \text{[Equation 4]}$$

$$RHCP: e_R = \frac{1}{\sqrt{2}} \begin{bmatrix} 1 \\ -j \end{bmatrix}$$

A Tx LP signal $s_{LP}$ may be defined as Equation 5 below. Here, $s_H = s_0$ and $s_V = s_1$ may be defined.

$$s_{LP} = s_H e_H + s_V e_V \quad \text{[Equation 5]}$$

The Tx LP signal $s_{LP}$ may be analyzed based on the polarization scheme. A value of the Tx LP signal $s_{LP}$ analyzed based on the polarization scheme may be defined as follows. The Tx LP signal $s_{LP}$ may be referred to as an LP signal $s_{LP}$.

$LP: [s_0, s_1]$ $XP: \left[\frac{1}{\sqrt{2}}(s_0 + s_1), \frac{1}{\sqrt{2}}(s_0 - s_1)\right]$ $CP: \left[\frac{1}{\sqrt{2}}(s_0) - \frac{j}{\sqrt{2}}(s_1), \frac{1}{\sqrt{2}}(s_0) + \frac{j}{\sqrt{2}}(s_1)\right]$ Calculated values based on the polarization scheme may be defined as Equations 6 to 8 below.

$$e_{HH} = e_H^H e_H = \begin{bmatrix}1\\0\end{bmatrix}^H \begin{bmatrix}1\\0\end{bmatrix} = 1 \quad \text{[Equation 6]}$$

$$e_{HV} = e_H^H e_V = \begin{bmatrix}1\\0\end{bmatrix}^H \begin{bmatrix}0\\1\end{bmatrix} = 0$$

$$e_{VH} = e_V^H e_H = \begin{bmatrix}0\\1\end{bmatrix}^H \begin{bmatrix}1\\0\end{bmatrix} = 0$$

$$e_{VV} = e_V^H e_V = \begin{bmatrix}0\\1\end{bmatrix}^H \begin{bmatrix}0\\1\end{bmatrix} = 1$$

$$C_{LPLP} = E_{LPLP} = \begin{bmatrix}e_{HH} & e_{HV}\\ e_{VH} & e_{VV}\end{bmatrix} = \begin{bmatrix}1 & 0\\0 & 1\end{bmatrix} \quad \text{[Equation 7]}$$

$$C_{LPXP} = E_{XPLP} = \begin{bmatrix}e_{+H} & e_{+V}\\ e_{-H} & e_{-V}\end{bmatrix} = \frac{1}{\sqrt{2}}\begin{bmatrix}1 & 1\\-1 & 1\end{bmatrix}$$

$$C_{LPCP} = E_{CPLP} = \begin{bmatrix}e_{LH} & e_{LV}\\ e_{RH} & e_{RV}\end{bmatrix} = \frac{1}{\sqrt{2}}\begin{bmatrix}1 & -j\\1 & j\end{bmatrix}$$

$$\begin{bmatrix}e_+^H s_{LP}\\ e_-^H s_{LP}\end{bmatrix} = \begin{bmatrix}e_+^H(s_H e_H + s_V e_V)\\ e_-^H(s_L e_L + s_R e_R)\end{bmatrix} = \begin{bmatrix}s_H(e_+^H e_H) + s_V(e_+^H e_V)\\ s_H(e_-^H e_H) + s_V(e_-^H e_V)\end{bmatrix} = \quad \text{[Equation 8]}$$
$$\frac{1}{\sqrt{2}}\begin{bmatrix}s_H + s_V\\ -(s_H - s_V)\end{bmatrix} = \frac{1}{\sqrt{2}}\begin{bmatrix}(s_0 + s_1)\\ -(s_0 - s_1)\end{bmatrix}$$

Equation 7 may refer to a conversion matrix. $C_{LPLP}$ may be used at a transmitting node to convert a baseband LP signal into an LP signal to be transmitted through an RF antenna. $E_{LPLP}$ may be used at a receiving node to convert an LP signal received through an RF antenna into a baseband LP signal. $C_{LPXP}$ may be used at a transmitting node to convert a baseband LP signal into an XP signal to be transmitted through an RF antenna. $E_{XPLP}$ may be used at a receiving node to convert an XP signal received through an RF antenna into a baseband LP signal. $C_{LPCP}$ may be used at a transmitting node to convert a baseband LP signal into a CP signal to be transmitted through an RF antenna. $E_{CPLP}$ may be used at a receiving node to convert a CP signal received through an RF antenna into a baseband LP signal.

A Tx XP signal $s_{XP}$ may be defined as Equation 9 below. Here, $s_+ = s_0$ and $s_- = s_1$ may be defined.

$$s_{XP} = s_+ e_+ + s_- e_- \quad \text{[Equation 9]}$$

The Tx XP signal $s_{XP}$ may be analyzed based on the polarization scheme. A value of the Tx XP signal $s_{XP}$ analyzed based on the polarization scheme may be defined as follows. The Tx XP signal $s_{XP}$ may be referred to as an XP signal $s_{XP}$.

$LP: \left[\frac{1}{\sqrt{2}}(s_0 - s_1), \frac{1}{\sqrt{2}}(s_0 + s_1)\right]$ $XP: [s_0, s_1]$ $CP: \left[\frac{1}{2}(s_0 - s_1) - \frac{j}{2}(s_0 + s_1), \frac{1}{2}(s_0 - s_1) + \frac{j}{2}(s_0 + s_1)\right]$ Calculated values based on the polarization scheme may be defined as Equations 10 to 12 below.

$$C_{XPLP} = E_{LPXP} = \begin{bmatrix}e_{H+} & e_{H-}\\ e_{V+} & e_{V-}\end{bmatrix} = \frac{1}{\sqrt{2}}\begin{bmatrix}1 & -1\\1 & 1\end{bmatrix} \quad \text{[Equation 10]}$$

$$C_{XPXP} = E_{XPXP} = \begin{bmatrix}c_{++} & c_\pm\\ c_\mp & c_{--}\end{bmatrix} = \begin{bmatrix}1 & 0\\0 & 1\end{bmatrix} \quad \text{[Equation 11]}$$

$$C_{XPCP} = E_{CPXP} = \begin{bmatrix}c_{L+} & c_{L-}\\ c_{R+} & c_{R-}\end{bmatrix} = \frac{1}{2}\begin{bmatrix}1-j & -1-j\\1+j & -1+j\end{bmatrix} \quad \text{[Equation 12]}$$

Equation 10 to Equation 12 may refer to conversion matrices. $C_{XPLP}$ may be used at a transmitting node to convert a baseband XP signal into an LP signal to be transmitted through an RF antenna. $E_{LPXP}$ may be used at a receiving node to convert an LP signal received through an RF antenna into a baseband XP signal. $C_{XPXP}$ may be used at a transmitting node to convert a baseband XP signal into a XP signal to be transmitted through an RF antenna. $E_{XPXP}$ may be used at a receiving node to convert an XP signal received through an RF antenna into a baseband XP signal. $C_{XPCP}$ may be used at a transmitting node to convert a baseband XP signal into a CP signal to be transmitted through an RF antenna. $E_{CPXP}$ may be used at a receiving node to convert a CP signal received through an RF antenna into a baseband XP signal.

A Tx CP signal $s_{CP,BB}$ may be defined as Equation 13 below. Here, $s_L = s_0$ and $s_R = s_1$ may be defined.

$$s_{CP,BB} = s_L e_L + s_R e_R \quad \text{[Equation 15]}$$

The Tx CP signal $s_{CP,BB}$ may be analyzed based on the polarization scheme. A value of the Tx CP signal $s_{CP,BB}$ analyzed based on the polarization scheme may be defined as follows. The Tx CP signal $s_{CP,BB}$ may be referred to as a CP signal $s_{CP,BB}$.

$LP: \left[\frac{1}{\sqrt{2}}(s_0 + s_1), \frac{j}{\sqrt{2}}(s_0 - s_1)\right]$ $XP: \left[\frac{1}{2}(s_0 + s_1) + \frac{j}{2}(s_0 - s_1), -\frac{1}{2}(s_0 + s_1) + \frac{j}{2}(s_0 - s_1)\right]$ $CP: [s_0, s_1]$ Calculated values based on the polarization scheme be defined as Equations 14 to 16 below.

$$C_{CPLP} = E_{LPCP} = \begin{bmatrix}e_{HL} & e_{HR}\\ e_{VL} & e_{VR}\end{bmatrix} = \frac{1}{\sqrt{2}}\begin{bmatrix}1 & 1\\ j & -j\end{bmatrix} \quad \text{[Equation 14]}$$

$$C_{CPXP} = E_{XPCP} = \begin{bmatrix}e_{+L} & e_{+R}\\ e_{-L} & e_{-R}\end{bmatrix} = \frac{1}{2}\begin{bmatrix}1+j & 1-j\\ -1+j & -1-j\end{bmatrix} \quad \text{[Equation 15]}$$

$$C_{CPCP} = E_{CPCP} = \begin{bmatrix}e_{LL} & e_{LR}\\ e_{RL} & e_{RR}\end{bmatrix} = \begin{bmatrix}1 & 0\\0 & 1\end{bmatrix} \quad \text{[Equation 16]}$$

Equation 14 to Equation 16 may refer to conversion matrices. $C_{CPLP}$ may be used at a transmitting node to convert a baseband CP signal into an LP signal to be transmitted through an RF antenna. $E_{LPCP}$ may be used at a receiving node to convert an LP signal received through an RF antenna into a baseband CP signal. $C_{CPXP}$ may be used at a transmitting node to convert a baseband CP signal into an XP signal to be transmitted through an RF antenna. $E_{XPCP}$ may be used at a receiving node to convert an XP signal received through an RF antenna into a baseband CP signal. $C_{CPCP}$ may be used at a transmitting node to convert a baseband CP signal into a CP signal to be transmitted through an RF antenna. $E_{CPCP}$ may be used at a receiving node to convert a CP signal received through an RF antenna into a baseband CP signal.

Meanwhile, a communication node may include an LP antenna, an XP antenna, and a CP antenna. The same signal (e.g. LP signal $S_{LP}$) may be delivered to each antenna (e.g. LP antenna, XP antenna, and CP antenna) after baseband processing. In this case, polarization conversion may be performed as follows.

The baseband processor may deliver [$s_0$, $s_1$] to the LP antenna. [$s_0$, $s_1$] may be a baseband symbol (e.g. baseband signal).

The baseband processor may deliver $$\left[ \frac{1}{\sqrt{2}}(s_0+s_1), \frac{1}{\sqrt{2}}(s_0-s_1) \right]$$

to the XP antenna.

$$\left[ \frac{1}{\sqrt{2}}(s_0+s_1), \frac{1}{\sqrt{2}}(s_0-s_1) \right]$$

may be a baseband symbol (e.g. baseband signal).
The baseband processor may deliver $$\left[ \frac{1}{\sqrt{2}}(s_0) - \frac{j}{\sqrt{2}}(s_1), \frac{1}{\sqrt{2}}(s_0) + \frac{j}{\sqrt{2}}(s_1) \right]$$

to the CP antenna.

$$\left[ \frac{1}{\sqrt{2}}(s_0) - \frac{j}{\sqrt{2}}(s_1), \frac{1}{\sqrt{2}}(s_0) + \frac{j}{\sqrt{2}}(s_1) \right]$$

may be a baseband symbol (e.g. baseband signal).

When a target polarization is LP and a source polarization is XP, the conversion matrix ($C_{LPXP}=E_{XPLP}$) may be multiplied by the baseband symbol. For polarization conversion, a conversion matrix defined in Equation 17 below may be multiplied by a baseband symbol or a signal received through an RF antenna. The transmitting node may multiply the baseband symbol by $C_{\{Target\ Pol.\}\{Source\ Pol.\}}$. The receiving node may multiply the signal received from the RF antenna by $E_{\{Source\ Pol.\}\{Target\ Pol.\}}$. Target Pol may mean the target polarization. Source Pol may indicate the source polarization. Exemplary embodiments of the present disclosure will be described focusing on the polarization conversion method at the transmitting node, but a polarization conversion method at the receiving node may be performed as a method corresponding to the polarization conversion method at the transmitting node. Compensation for polarization mismatch can be performed by performing the polarization conversion method at the transmitting node and/or the receiving node.

$$C_{\{Target\ Pol.\}\{Source\ Pol.\}} = E_{\{Source\ Pol.\}\{Target\ Pol.\}} \quad \text{[Equation 17]}$$

According to the above-described method, a desired polarized signal may be generated by performing a post-processing operation on a baseband symbol (e.g. baseband signal) or a signal received from an RF antenna. In other words, the post-processing operation on the baseband symbol (e.g. baseband signal) or signal received from the RF antenna may be additionally performed. The post-processing operation in the transmitting node may refer to the operation of multiplying the baseband signal by the conversion matrix (e.g. $C_{\{Target\ Pol.\}\{Source\ Pol.\}}$). The post-processing operation in the receiving node may refer to the operation of multiplying the baseband signal by the conversion matrix (e.g. $E_{\{Source\ Pol.\}\{Target\ Pol.\}}$).

Figure 7:
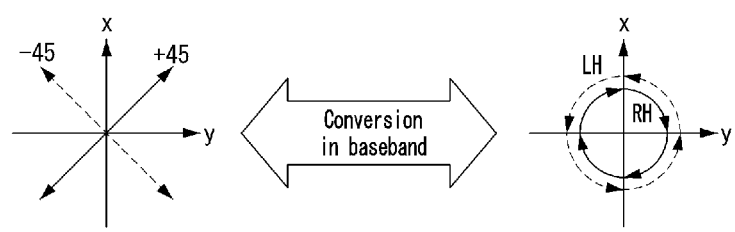
FIG. 7 is a conceptual diagram illustrating an exemplary embodiment of a polarization conversion operation.

FIG. 7 is a conceptual diagram illustrating an exemplary embodiment of a polarization conversion operation.

Referring to FIG. 7, a conversion operation between XP and CP may be performed in the baseband (e.g. baseband processor). A conversion matrix may be used for the polarization conversion operation. For example, a baseband signal for a source polarization may be $$\begin{bmatrix} s_0 \\ s_1 \end{bmatrix},$$

and a baseband signal for a target polarization may be $$\begin{bmatrix} t_0 \\ t_1 \end{bmatrix} = C_{\{Target\ Pol.\}\{Source\ Pol\}} \begin{bmatrix} s_o \\ s_1 \end{bmatrix}.$$

In other words, the baseband signal for the target polarization may be a product of the conversion matrix and the baseband signal for the source polarization. The polarization conversion operation may be performed considering the relationship shown in FIG. 7.

The conversion matrices may be defined in various forms. In the present disclosure, the conversion matrix may be referred to as C. For example, C"=C'⊙C may be defined. ⊙ may mean an elementwise product operator.

C' may have linear combinations of {+1, −1, +j, −j, +cos Ψ, −cos Ψ, +j cos Ψ, −j cos Ψ, +sin Ψ, −sin Ψ, +j sin Ψ, −j sin Ψ} as elements. C' may be a matrix C' of the same dimension as C.

According to the above-described method, a communication node (e.g. transmitting node and/or receiving node) may transmit or receive signals having various polarizations using one antenna (e.g. one polarization antenna) without a separate RF device (e.g. RF antenna). Therefore, cost efficiency can be increased and polarization mismatch loss can be minimized.

According to the conventional method, in order to transmit signals with various polarizations, a communication node may transmit the same baseband signal through different RF devices (e.g. LP antenna, XP antenna, and CP antenna). However, according to the methods proposed in the present disclosure, a communication node can generate a signal by multiplying a baseband signal for a specific polarization by a conversion matrix, and transmit the generated signal through one RF device (e.g. the same RF antenna). In addition, the communication node can receive polarized signals having different polarization schemes through one RF device, generate a baseband signal by multiplying each of the polarized signals by a conversion matrix, and obtain modulation symbols (e.g. set of modulation symbols) from the baseband signal. According to the methods proposed in the present disclosure, polarization mismatch loss can be reduced and the performance of the communication network can be improved.

Various types of polarization diversity transmission can be supported using one antenna (e.g. one polarization antenna). According to the conventional method, the same polarization may be used for each direction (e.g. downlink direction or uplink direction) in all communication procedures provided by one base station. However, according to the methods proposed in the present disclosure, a combination of various polarization schemes can be used depending on a situation. Since a channel experienced by each polarization may be different, a diversity effect can be expected when a retransmission operation or repeated transmission operation is performed using a changed polarization scheme (e.g. various polarization schemes). Accordingly, the performance of the communication network can be improved. For example, an initial transmission operation may be performed based on a first polarization scheme (e.g. CP), and a retransmission operation may be performed based on a second polarization scheme (e.g. XP). A first repeated transmission operation may be performed based on a first polarization scheme (e.g. CP), and a second repeated transmission operation may be performed based on a second polarization scheme (e.g. XP).

A configuration and application unit of the polarization may be applied flexibly. According to the conventional method, when a polarized signal is processed in an RF/antenna, the minimum unit that can be processed for the polarized signal may be a unit of a final signal generated in the baseband.

In the NR communication and/or LTE communication, a waveform of a final signal generated in the baseband may be an OFDM waveform, and the final signal may exist for each antenna. Therefore, a minimum processing unit of polarization configuration (e.g. polarized signal) may be an antenna. The polarized signal may be configured for each beam generated by one or more antennas. Alternatively, the polarized signal may be configured for each link.

In the methods proposed in the present disclosure, polarized signals can be processed in the baseband, so a minimum unit that can be processed for the polarized signals may be a modulation symbol. In the NR communication and/or LTE communication, a modulation symbol is mapped to a resource element (RE), so the minimum unit that can be processed for the polarized signal may be a modulation symbol or RE. Accordingly, according to the method proposed in the present disclosure, the polarized signal can be configured in more detail than the conventional method (e.g. configuration of a polarized signal for each beam or link). Multiple polarization schemes can be applied in one antenna. Transmission of polarized signals can be flexibly and efficiently adjusted in units of modulation symbols or REs. Accordingly, transmission performance can be improved.

Usage Scenario #1: Compensation for Polarization Mismatch

If there is a mismatch in polarization schemes (e.g. polarization types, antenna polarization types) between a transmitting node and a receiving node, one of the transmitting node and receiving node may perform polarization compensation (i.e. application of a conversion matrix) according to the polarization scheme of the other node (e.g. counterpart node). The transmitting node may be a communication node that transmits a signal/channel (e.g. polarized signal). The receiving node may be a communication node that receives the signal/channel (e.g. polarized signal). Each of the transmitting node and receiving node may be a terrestrial communication node or a non-terrestrial communication node.

For example, the terrestrial communication node (e.g. terrestrial base station or terrestrial terminal) may use LP or XP. The non-terrestrial communication node (e.g. non-terrestrial base station or non-terrestrial terminal) may use CP. The non-terrestrial communication node may be a ship, aircraft, UAV, drone, very small antenna terminal (VSAT), or the like.

In order to perform polarization compensation, one of the transmitting node and the receiving node (e.g. base station or terminal) may signal information on the polarization scheme (e.g. LP, XP, or CP) used by the one node to the counterpart node through signaling. The counterpart node may receive information on the polarization scheme from the one node and perform polarization compensation based on the information on the polarization scheme. In the present disclosure, signaling may be at least one of SI signaling, RRC signaling, MAC CE signaling, or PHY signaling.

The base station may transmit the information on the polarization scheme to the terminal based on Scheme #1-1 or Scheme #1-2 below. The base station may be a non-terrestrial base station or a terrestrial base station, and the terminal may be a non-terrestrial terminal or a terrestrial terminal.

Scheme #1-1: The base station may indicate information on its polarization scheme to the terminal.

Scheme #1-2: The base station may indicate information on a polarization scheme to be used by the terminal to transmit and receive signals. In this case, the base station may not indicate its polarization scheme to the terminal.

The terminal may transmit the information on the polarization scheme to the base station based on Scheme #2-1 or Scheme #2-2 below. The base station may be a non-terrestrial base station or a terrestrial base station, and the terminal may be a non-terrestrial terminal or a terrestrial terminal.

Scheme #2-1: The terminal may indicate information on its polarization scheme to the base station.

Scheme #2-2: The base station may configure different synchronization signal blocks (SSBs) for the respective polarization schemes. For example, a first SSB (e.g. first SSB set) for LP may be configured, a second SSB (e.g. second SSB set) for XP may be configured, and a third SSB (e.g. third SSB set) for CP may be configured. A first random access channel (RACH) occasion (e.g. first RACH occasion set) for the first SSB (e.g. first SSB set) may be configured, a second RACH occasion (e.g. second RACH occasion set) for the second SSB (e.g. second SSB set) may be configured, and a third RACH occasion (e.g. third RACH occasion set) for the third SSB (e.g. third SSB set) may be configured. The base station may signal configuration information of the SSBs and/or the RACH occasions to the terminal. When the terminal uses LP, the terminal may transmit an RA preamble in the first RACH occasion associated with the first SSB for LP. When the RA preamble of the terminal is received in the first RACH occasion, the base station may estimate the polarization scheme used by the terminal as LP. When the terminal uses XP, the terminal may transmit an RA preamble in the second RACH occasion associated with the second SSB for XP. When the RA preamble of the terminal is received in the second RACH occasion, the base station may estimate the polarization scheme used by the terminal as XP. When the terminal uses CP, the terminal may transmit an RA preamble in the third RACH occasion associated with the third SSB for CP. When the RA preamble of the terminal is received in the third RACH occasion, the base station may estimate the polarization scheme used by the terminal as CP.

Usage Scenario #2: Polarization Diversity Transmission

When polarization diversity transmission is performed, a communication node may transmit the same signal multiple times using various polarization schemes. For example, the communication node may generate a first signal having a first polarization scheme by multiplying the same signal by a first conversion matrix, generate a second signal having a second polarization scheme by multiplying the same signal by a second conversion matrix, and transmit the first signal and the second signal. In this case, communication coverage can be improved by multiple versions of the same signal. For polarization diversity transmission, one of the transmitting node and the receiving node may transmit information on a combination of polarizations to the counterpart node through signaling. The polarization diversity transmission based on different polarization combinations may be performed for the respective physical channels and/or physical signals. For example, a PDCCH may be transmitted based on a first polarization combination, and a PDSCH may be transmitted based on a second polarization combination. A channel state information-reference signal (CSI-RS) may be transmitted based on a first polarization combination, and a demodulation-reference signal (DM-RS) may be transmitted based on a second polarization combination.

The polarization combinations used for polarization diversity transmission may be defined as follows.

The polarization combination may be based on one polarization scheme.

Exemplary embodiment #1: {first transmission, second transmission}={horizontal polarization, vertical polarization} or {linear polarization, linear polarization}

Exemplary embodiment #2: {first transmission, second transmission}={+45 degree polarization, −45 degree polarization} or {cross polarization, cross polarization}

Exemplary embodiment #3: {first transmission, second transmission}={LHCP, RHCP} or {circular polarization, circular polarization}

The polarization combinations may be based on multiple polarization schemes.

Exemplary embodiment #4: {first transmission, second transmission}={+45 degree polarization, LHCP} or {Cross polarization, Circular polarization}

Exemplary embodiment #5: {first transmission, second transmission}={+45 degree polarization, RHCP} or {Cross polarization, Circular polarization}

Exemplary embodiment #6: {first transmission, second transmission}={−45 degree polarization, LHCP} or {cross polarization, circular polarization}

Exemplary embodiment #7: {first transmission, second transmission}={−45 degree polarization, RHCP} or {cross polarization, circular polarization}

Based on the above-described method, N polarization combinations may be configured. N may be a natural number. The polarization combinations may be configured in various ways. For example, the polarization combination may be configured as {circular polarization, cross polarization}, {linear polarization, cross polarization}, or {linear polarization, circular polarization}.

Figure 8:
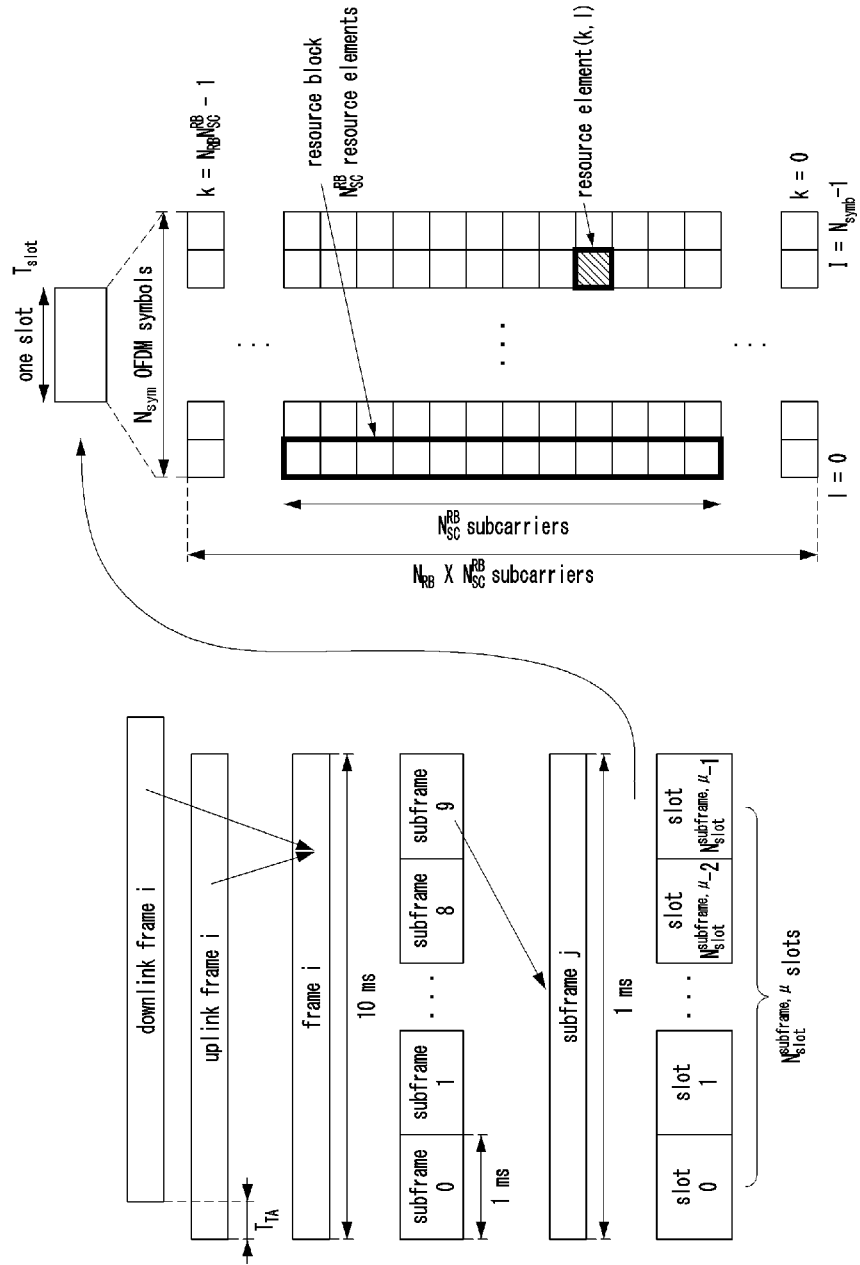
FIG. 8 is a conceptual diagram illustrating an exemplary embodiment of a physical resource structure.

FIG. 8 is a conceptual diagram illustrating an exemplary embodiment of a physical resource structure.

Figure 9:
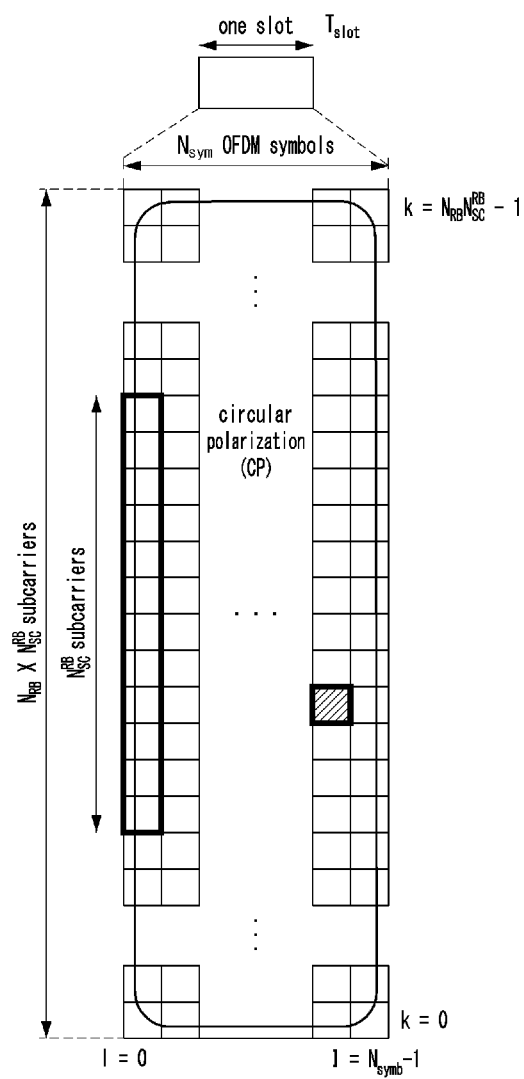
FIG. 9 is a conceptual diagram illustrating a first exemplary embodiment of a method of applying a polarized signal in a physical resource structure.

Referring to FIG. 8, frames may be classified into downlink frames and uplink frames. A frame may include 10 subframes. One frame may include n slots according to a numerology. n may be a natural number. One slot may include $N_{symb}$ OFDM symbols in the time domain. One slot may include one or more subcarriers in the frequency domain. FIG. 9 is a conceptual diagram illustrating a first exemplary embodiment of a method of applying a polarized signal in a physical resource structure.

Referring to FIG. 9, a polarized signal (e.g. CP signal) may be configured in unit of a resource region. The resource region may include one slot in the time domain. The resource region may include $N_{RB} \times N_{SC}^{RB}$ subcarriers in the frequency domain. $N_{RB}$ may mean the number of resource blocks (RBs). $N_{SC}^{RB}$ may mean the number of subcarriers included in one RB.

Figure 10:
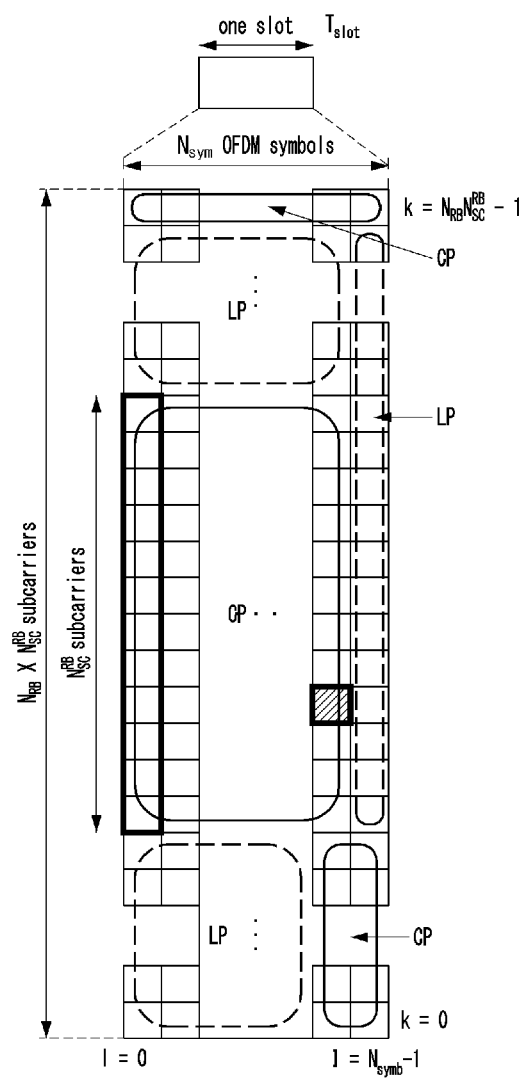
FIG. 10 is a conceptual diagram illustrating a second exemplary embodiment of a method of applying a polarized signal in a physical resource structure.

FIG. 10 is a conceptual diagram illustrating a second exemplary embodiment of a method of applying a polarized signal in a physical resource structure.

Referring to FIG. 10, a polarized signal may be configured in unit of a more refined resource region compared to the exemplary embodiment of FIG. 9. The polarization scheme may be configured to a baseband signal or to a unit smaller than the baseband signal. In NR communication, a waveform of a baseband signal may be cyclic prefix (CP)-OFDM or discrete Fourier transform (DFT)-spread (S)-OFDM. Therefore, since polarization is applied to a modulated signal, a polarization scheme in form of frequency division multiplexing (FDM) may not be configured. In other words, according to the conventional method, signals with different polarizations cannot exist within one antenna at a specific point in time. According to the conventional method, the exemplary embodiment of FIG. 9 can be implemented, but the exemplary embodiment of FIG. 10 cannot be implemented. According to the conventional method, multiple antennas may be needed to transmit signals with different polarizations. According to the methods proposed in the present disclosure, one antenna may be needed to transmit signals with different polarizations. According to the methods proposed in the present disclosure, both the exemplary embodiment of FIG. 9 and the exemplary embodiment of FIG. 10 can be implemented.

Usage Scenario #3: Configuration and Transmission of a Polarized Signal with Fine Granularity In the conventional method, polarized transmission (e.g. polarized signals) may be implemented at an RF/antennas. Therefore, polarized transmission may be configured for each antenna, beam, or link. However, according to the methods proposed in the present disclosure, polarized transmission (e.g. polarized signal) may be implemented in the baseband. In this case, a polarized signal with fine granularity can be configured.

For example, to generate a polarized signal for each modulation symbol (e.g. set of modulation symbols), a conversion matrix (e.g. polarization conversion matrix) may be multiplied to each modulation symbol (e.g. set of modulation symbols). The set of modulation symbols may include one or more modulation symbols. A separate resource grid may be defined for each antenna polarization scheme, and a conversion matrix multiplied by each resource grid may be defined. In other words, the resource grid may be defined separately for each polarization scheme, a communication node may multiplex modulation symbols in the resource grid, and multiply the resource grid with the modulation symbols multiplexed by the conversion matrix. According to the above-described operation, a separate polarized signal may be generated for each modulation symbol.

A minimum applicable unit for a polarized signal may be a modulation symbol or RE. In NR communication, one modulation symbol may be mapped to one RE. Therefore, a different polarization scheme may be applied to each modulation symbol or RE. According to the methods proposed in the present disclosure, a polarized signal with a granularity smaller than the polarized signal on an antenna, beam, or link basis can be generated.

According to the above-described method, a polarized signal with finer granularity than the conventional method can be generated, and the polarized signal with finer granularity may be mapped to physical resources. In this case, physical resources can be used flexibly and efficiently, and efficient multiplexing can be performed. Therefore, transmission performance can be improved.

For a combination unit (e.g. set unit) of modulation symbol(s), a polarized signal may be generated for each combination unit. A sequence, codeword, physical signal, physical channel, or the like may be configured as a combination (e.g. set) of modulation symbol(s). Since a physical signal or physical channel is transmitted through a physical layer, the same processing as the physical signal or physical channel may be possible in an upper layer (e.g. upper layer protocol layer, upper layer protocol unit). In terms of physical resources, configuration of the polarized signal may be possible automatically.

Since a modulation symbol is mapped to an RE, a polarized signal may be generated (e.g. configured) for a combination unit of RE(s). One RE may include one subcarrier and one symbol. Therefore, a polarized signal may be generated (or configured) for each resource unit (e.g. RE, subcarrier (SC), resource block (RB), bandwidth part (BWP), resource grid (RG), symbol, slot, subframe, frame, antenna, antenna port, beam, link, resource element group (REG), control channel element (CCE), control resource set (CORESET), search space, etc.) supported in NR communication. A polarized signal may be configured for a unit (e.g. modulation symbol which is the minimum unit) of content (e.g. information) indicated through physical resources. A polarized signal may be configured for a unit of information of a physical resource itself (e.g. RE which is the minimum unit).

Considering the above-described method, a method of configuring a polarization scheme, a method of changing a polarization scheme, and the like may be required. In the present disclosure, the meanings of 'indicate', 'share', 'provide', 'update', 'deliver', and 'request' may mean transmission of content indicated by a physical resource and/or information of a physical resource itself to a counterpart node through signaling. Transmission of information may include explicit transmission of the information and/or implicit transmission of the information. The information may be estimated based on a predefined manner (e.g. mathematical equation, table, and/or the like). For example, content indicated through a physical resource may refer to a combination of the exemplary embodiment(s) below.

Content and distinguisher of a combination unit of modulation symbol(s)
    A distinguisher may refer to a means that can specify a number, identifier (ID), index, location, region, address, or the like as a part of the unit or the entire unit.
Content and distinguisher of a sequence of modulation symbols, codeword, or the like
Content and distinguisher of a physical signal (e.g. reference signal, synchronization signal, or the like)
Content and distinguisher of a physical channel (e.g. physical broadcast channel (PBCH), physical downlink control channel (PDCCH), physical downlink shared channel (PDSCH), physical random access channel (PRACH), physical uplink control channel (PUCCH), physical uplink shared channel (PUSCH), physical sidelink broadcast channel (PSBCH), physical sidelink control channel (PSCCH), physical sidelink shared channel (PSSCH), physical sidelink feedback channel (PSFCH), and the like)
For example, downlink control information (DCI) transmitted on a PDCCH may be included in a content of the PDCCH itself. Uplink control information (UCI) transmitted on a PUCCH may be included in a content of the PUCCH itself. A radio network temporary identifier (RNTI) used for cyclic redundancy check (CRC) scrambling may be included in a content of the PDCCH or PUCCH itself.
Content and distinguisher of an upper layer protocol unit (e.g. MAC (sub)protocol data unit (PDU) which is a combination of a MAC subheader, MAC CE, and/or MAC service data unit (SDU), RRC message, RRC information element (IE), other higher layer message, information element, header, and the like)

For example, information on a physical resource itself may refer to a combination of the exemplary embodiment(s) below.

Distinguisher of a unit that can be formed as a combination of REs
    A distinguisher may refer to a means that can specify a number, identifier (ID), index, location, region, address, or the like as a part of the unit or the entire unit.
Distinguisher of an RE, SC, RB, BWP, or RG
    A distinguisher for an SC unit may include an SC number. In addition, the distinguisher for an SC unit may optionally further include a distinguisher of an upper unit (e.g. RB, RG, etc.) to which the corresponding SC belongs.
Distinguisher of a symbol, slot, subframe, or frame
    A distinguisher for a symbol unit may include a symbol number. In addition, the distinguisher for a symbol unit may optionally further include a distinguisher of an upper unit (e.g. slot, subframe, etc.) to which the corresponding symbol belongs.
Distinguisher of an antenna, antenna port, beam, or link
    A distinguisher (e.g. number, location, region, ID) for an REG, CCE, CORESET, or search space The polarization scheme may be configured to avoid polarization mismatch as much as possible. For example, a transmitting node and a receiving node may have one or more polarization configuration capabilities, and the one or more polarization configuration capabilities may be exchanged between the transmitting node and the receiving node. In this case, polarization mismatch between the transmitting node and the receiving node may be suppressed as much as possible, and exemplary embodiments below may be considered.

Exemplary Embodiment #1: Method of Indicating a Polarization Configuration Capability and/or Polarization Scheme A configuration unit of a polarization scheme may be configured more flexibly than the existing configuration unit. A polarization configuration capability may refer to a configuration unit of a polarized signal. Additionally, the polarization configuration capability may include information on supportable polarization scheme. The polarization schemes may mean LP, CP, and/or XP. The polarization scheme may mean a combination of two or more polarizations among LP, CP, or XP.

Exemplary Embodiment #2: Application of a Polarization Scheme According to the Number of Transmissions or Repetitions Exemplary embodiment #2 may be applied for each specific channel. Therefore, the exemplary embodiment #2 may have characteristics of exemplary embodiment #3-1. The number of transmissions (or number of repetitions) may be defined on a slot basis. Therefore, the exemplary embodiment #2 may have characteristics of exemplary embodiment #3-2. The exemplary embodiment #2 may be understood as a combination of the exemplary embodiment #3-1 and exemplary embodiment #3-2. The exemplary embodiment #2 may be understood as multiplexing of polarization schemes according to the number of transmissions (or number of repetitions).

Exemplary Embodiment #3-1: Application of a Polarization Scheme for Each Channel/Signal Exemplary Embodiment #3-2: Application of a Polarization Scheme for Each Physical Resource The above-described exemplary embodiments may not be mutually exclusive. A combination of two or more of the above exemplary embodiments may be performed.

The exemplary embodiment #1 (e.g. method of indicating polarization configuration capability and/or polarization scheme) may include a method of indicating polarization configuration capability (e.g. procedure #1, procedure #2) and a method (e.g. procedure #3, procedure #4) of indicating polarization scheme(s) using the indication methods described above.

Based on the exemplary embodiment #1, a first communication node may indicate some or all of its polarization configuration capabilities to a second communication node. A procedure for the exemplary embodiment #1 may be as follows. When the first communication node is a base station, the second communication node may be a terminal. When the first communication node is a terminal, the second communication node may be a base station.

Procedure #1: The base station may indicate some or all of its polarization configuration capabilities to the terminal. The terminal may identify the polarization configuration capability indicated by the base station.

Procedure #2: The terminal may indicate some or all of its polarization configuration capabilities to the base station. The base station may identify the polarization configuration capability indicated by the terminal.

The procedure #1 and procedure #2 may be performed in any order. For example, the procedure #1 may be performed first, and the procedure #2 may be performed after the procedure #1 is performed. Alternatively, the procedure #2 may be performed first, and the procedure #1 may be performed after the procedure #2 is performed. One of the procedure #1 or the procedure #2 may be omitted. The procedure #1 may be performed at a request of the terminal. Alternatively, the procedure #1 may be performed without a request from the terminal. The procedure #2 may be performed at a request of the base station. Alternatively, the procedure #2 may be performed without a request from the base station. If a communication node is capable of configuring (e.g. generating, transmitting, receiving, or processing) one or more polarized signals, the communication node may inform its polarization configuration capability. In other words, if a communication node is not capable of configuring (e.g. generating, transmitting, receiving, or processing) a polarized signal, the communication node may not inform its polarization configuration capability.

Information elements indicated in the exemplary embodiment #1 may include at least one of information elements below.

Information element indicating whether one or more polarization schemes can be configured Information element indicating configurable polarization scheme(s)

Information element indicating whether multiple polarization schemes can be configured simultaneously Information element indicating simultaneously configurable polarization schemes Information element indicating a polarization scheme currently in use The polarization configuration capability may be indicated on a link-by-link basis. Alternatively, the polarization configuration capability may be indicated in a more granular unit than link unit. Based on the procedure #1 of exemplary embodiment #1, the base station may indicate its polarization configuration capability to the terminal. According to the existing method, the base station may indicate to the terminal one of LP, LHCP, or RHCP polarization scheme using ntn-PolarizationDL included in the SIB19 and/or MeasConfig. Additionally, the base station may indicate to the terminal one of LP, LHCP, or RHCP polarization scheme using ntn-PolarizationUL included in the SIB19 and/or MeasConfig. In other words, the base station may indicate to the terminal one polarization scheme for downlink and one polarization scheme for uplink.

When the SIB19 is cell-specific system information, the SIB19 may indicate one polarization scheme on a link basis within a cell. Independently of the per-link polarization scheme indicated by the SIB19, the base station may indicate its polarization configuration capability to the terminal. If a polarization scheme or a configuration capability (e.g. polarization configuration capability) for a specific polarization scheme is already indicated, the indication for the polarization scheme may be omitted.

Exemplary embodiments of the indication method may be as follows.

Exemplary embodiment #1 of the indication method: The base station may indicate to the terminal a list of configurable polarization schemes.

Exemplary embodiment #2 of the indication method: The base station may indicate to the terminal a separate configuration for each configurable polarization scheme.

The method of indicating a list of configurable polarization schemes may not be limited to a specific method. Since all configurations do not necessarily need to be indicated at once, a static or semi-static configuration method may not be used, and a dynamic configuration method may be used. In other words, configuration information may be dynamically indicated at a time it is needed. For example, the configuration information may be transmitted based on at least one of RRC signaling, MAC CE signaling, or PHY signaling.

Based on a procedure #2 of exemplary embodiment #1, the terminal may provide its polarization configuration capability to the base station. Identically to or similarly to the base station's indication method, the terminal may indicate its polarization configuration capability to the base station.

Based on a procedure #1 of the exemplary embodiment #1, the base station may indicate its polarization configuration capability to the terminal. The method of indicating the polarization configuration capability may be as follows.

Detailed exemplary embodiment #1 of the procedure #1: The base station may indicate to the terminal a list of configurable polarization schemes.

In the same form as a polarization list, a list of combinable polarization schemes may be indicated.

Unlike the existing methods (e.g. polarization scheme indication method by SIB19 or MeasConfig), a combination of one or more possible polarization schemes {CP, LP, XP, RHCP, LHCP, horizontal polarization, vertical polarization, +degree polarization (e.g. +45 degree polarization), −degree polarization (e.g. −45 degree polarization)}

The polarization schemes may be indicated by a table or bitmap instead of the list.

Detailed exemplary embodiment #2 of the procedure: The base station may additionally define a separate configuration for each polarization configuration scheme, and may indicate to the terminal configurable polarization scheme(s) based on the separate configuration.

The base station may define separate configurations (e.g. Polarzation-add0, Polarzation-add1, etc.) in addition to the existing configurations (e.g. ntn-PolarizationDL, ntn-PolarizationUL), and indicate to the terminal configurable polarization scheme(s) based on the separate configuration(s).

The base station may define a separate configuration for each polarization scheme and may indicate to the terminal configurable polarization scheme(s) based on the separate configurations.

In order to indicate CP configuration capability, the base station may additionally define CP configurations (e.g. LHCP, RHCP) and indicate to the terminal configurable polarization scheme(s) among LHCP and RHCP. In other words, the base station may provide the terminal with detailed CP configuration capability.

In order to indicate LP configuration capability, the base station may additionally define LP configurations (e.g. horizontal polarization, vertical polarization) and indicate to the terminal configurable polarization scheme(s) among horizontal polarization and vertical polarization. In other words, the base station may provide the terminal with detailed LP configuration capability.

To indicate XP configuration capability, the base station may additionally define XP configurations (e.g. +degree polarization, −degree polarization) and may indicated to the terminal configurable polarization scheme(s) among +degree polarization and −degree polarization. In other words, the base station may provide detailed XP configuration capability to the terminal.

Alternatively, the base station may configure a separate SIB19 for each polarization configuration scheme and transmit the separate SIB19 to the terminal.

When the SIB19 is cell-specific system information, multiple SIB19s may be configured.

Based on the procedure #2 of exemplary embodiment #1, the following detailed exemplary embodiments may be considered.

Detailed exemplary embodiment #1 of the procedure #2: Additional configurations for polarization configuration capability may be considered in UE information, UE capability information, and/or UE assistance information.

Detailed exemplary embodiment #2 of the procedure #2: The base station may indicate to the terminal configurable polarization scheme(s). The base station may independently configure RACH occasion(s) for polarization scheme(s) that can be configured by the base station and RACH occasion(s) for polarization scheme(s) that cannot be configured by the base station, and may transmit configuration information of the RACH occasions to the terminal. Alternatively, the base station may configure a separate RACH occasion according to a combination of polarization scheme(s) that the terminal can configure, and transmit configuration information of the RACH occasion to the terminal. The base station may identify polarization configuration capability of the terminal based on a RACH occasion in which an RA preamble of the terminal is received.

In a procedure #3 of the exemplary embodiment #1, the base station may indicate to the terminal polarization scheme(s). For example, the base station may define a polarization scheme for a desired configuration unit and indicate to the terminal a combination of polarization scheme(s).

In a procedure #4 of the exemplary embodiment #1, the terminal may request the base station to change a polarization scheme. For example, the terminal may define a polarization scheme for a desired configuration unit, and request the base station to change a combination of polarization scheme(s). In a procedure #5 of the exemplary embodiment #1, the base station may indicate to the terminal polarization scheme(s). The procedure #5 may include a procedure #5-1, procedure #5-2, and/or procedure #5-3, and may use at least one of the procedure #5-1, procedure #5-2, or procedure #5-3. The base station may indicate the terminal to configure a polarization scheme, and may additionally provide a polarization configuration of the base station to the terminal.

In the procedure #5-1, the base station may define a polarization scheme for a desired configuration unit and indicate to the terminal a combination of polarization scheme(s). The base station may additionally indicate to the terminal information on a polarization scheme used by the base station. The indication on the combination of polarization scheme(s) and the information on the polarization scheme used by the base station may be included in one message. When the base station knows the polarization configuration capability of the terminal, the base station may indicate to the terminal polarization scheme(s) that can be configured by the terminal by considering the polarization configuration capability of the terminal. If there is no intersection between the polarization configurations available to the base station and the polarization configurations available to the terminal (e.g. when an intersection between the polarization configurations available to the base station and the polarization configurations available to the terminal is empty), the base station may indicate polarization mismatch to the terminal. When the base station does not know the polarization configuration capability of the terminal, the base station may indicate the terminal to perform the procedure #2 (e.g. procedure in which the terminal indicates to the base station polarization configuration capability of the terminal). Alternatively, when the base station does not know polarization configuration capability of the terminal, the base station may determine one of its available polarization schemes (e.g. polarization configurations) and indicate to the terminal the determined polarization scheme.

The base station may determine (e.g. select) one polarization scheme among the remaining polarization schemes, excluding the polarization scheme(s) not used by the terminal (e.g. polarization scheme(s) not reported as used by the terminal) among the polarization schemes previously indicated by the base station to the terminal. If all polarization schemes previously indicated by the base station to the terminal are not used by the terminal, there may not be a polarization scheme that the base station can select. In other words, the polarization schemes configurable by the base station may be an empty set. In this case, the base station may indicate polarization mismatch to the terminal.

Based on the procedure #5-2, when the terminal carries out the indication of the base station, the terminal may report to the base station that the indication has been carried out, and when the terminal fails to carry out the indication of the base station, the terminal may report the base station that the indication has been not carried out.

When the base station makes a request that cannot be performed to the terminal with a specific polarization configuration capability, the terminal may additionally perform the procedure #2. For example, the terminal may indicate its polarization configuration capability to the base station.

Based on the procedure #5-3, if a polarization mismatch is recognized, the base station may perform an operation of selecting a polarization scheme with the best measurement result. If unmeasured polarization scheme(s) exist, the base station may indicate the unmeasured polarization scheme(s) for measurement, and determine a final polarization scheme based on a measurement result of the polarization scheme(s). Alternatively, the base station may maintain reliability as much as possible by performing polarization diversity transmission. Alternatively, if a polarization mismatch is recognized, the terminal may maintain the configuration indicated by the base station and stop requesting further changes.

The above-described procedures (e.g. procedure #5-1, procedure #5-2, procedure #5-3) may be performed selectively. Some of the above-described procedures may be omitted.

A procedure #6 of the exemplary embodiment #1 may be considered. Based on the procedure #6, the terminal may request a change in the polarization scheme of the base station. Additionally, the terminal may inform the base station of its polarization configuration (e.g. polarization configuration capability, polarization scheme).

Based on a procedure #6-1, the terminal may define a polarization scheme for a configuration unit that it wants to change, and request the base station to change the polarization scheme(s) by transmitting a combination of polarization scheme(s) to the base station. The terminal may additionally transmit information on polarization scheme(s) used by the terminal to the base station. The information on the combination of polarization scheme(s) and information on the polarization scheme(s) used by the terminal may be included in one message. When the terminal knows polarization configuration capability of the base station, the terminal may request polarization configuration from the base station by considering the polarization configuration capability of the base station. When there is no intersection between the polarization configurations available to the base station and the polarization configuration available to the terminal (e.g. when the intersection between the polarization configurations available to the base station and the polarization configurations available to the terminal is empty), the terminal may indicate polarization mismatch to the base station. When the terminal does not know the polarization configuration capability of the base station, the terminal may indicate the base station to perform the procedure #1 (e.g. procedure in which the base station indicates to the terminal the polarization configuration capability of the base station). Alternatively, when the terminal does not know the polarization configuration capability of the base station, the terminal may determine one of the polarization schemes (e.g. polarization configurations) available to it, and indicated the determined polarization scheme to the base station.

The terminal may determine (e.g. select) one polarization scheme among the remaining polarization schemes, excluding the polarization scheme(s) not indicated by a grant of the base station among the polarization schemes previously requested by the terminal from the base station. If the base station does not indicate a grant for all requests, there may not be a polarization scheme that the terminal can select. In other words, the polarization schemes that can be requested by the terminal may be an empty set. In this case, the terminal may indicate polarization mismatch to the base station. 6p Based on a procedure #6-2, when the base station accepts the terminal's request for polarization scheme(s), the base station may indicate a grant for the request to the terminal in response to the request. For example, the base station may re-indicate to the terminal the polarization scheme(s) requested by the terminal. When rejecting the terminal's request for the polarization scheme(s), the base station may indicate to the terminal that the terminal's request has been rejected. When the polarization scheme(s) requested by the terminal are not possible due to the polarization configuration capability of the base station, the base station may additionally perform the procedure #1 (e.g. procedure in which the base station indicates to the terminal the polarization configuration capability of the base station).

Based on a procedure #6-3, if a polarization mismatch is recognized, the terminal may perform an operation of selecting a polarization scheme with the best measurement result. If unmeasured polarization scheme(s) exist, the terminal may request a further change. The terminal may determine a final polarization scheme based on a measurement result of the polarization scheme(s). Alternatively, the terminal may maintain reliability as much as possible by requesting polarization diversity transmission from the base station. Alternatively, if a polarization mismatch is recognized, the base station may maintain the configuration indicated by itself and stop requesting further changes.

The above-described procedures (e.g. procedure #6-1, procedure #6-2, procedure #6-3) may be performed selectively. Some of the above-described procedures may be omitted.

When an intersection between the polarization configuration capability of the base station and the polarization configuration capability of the terminal is an empty set, compensation for a polarization mismatch may not be performed. In a situation where compensation for a polarization mismatch is feasible, the polarization mismatch may be resolved according to the procedure #5 and/or procedure #6.

According to the above-described procedures, the polarization mismatch can be avoided as much as possible.

The exemplary embodiment #2 may be considered as a method for configuring a polarization scheme. According to the exemplary embodiment #2, a polarization scheme may be applied depending on the number of transmissions or repetitions. For polarization diversity transmission, the base station may define a plurality of transmissions, configure a separate polarization scheme for each of the plurality of transmissions, and indicate the polarization scheme of each of the plurality of transmissions of the terminal. For example, a first polarization scheme may be configured/indicated for first transmission, and a second polarization scheme may be configured/indicated for second transmission.

A transmission occasion (TO) may be defined as a distinguisher to identify each of the plurality of transmissions. The TO may be interpreted as a transmission or repetition count. To configure polarization diversity transmission, a total number NPD of distinguishers (e.g. TOs) and a combination of polarization schemes to be respectively applied to the plurality of transmissions (or repetitions) for the polarization diversity transmission may be indicated.

Based on the exemplary embodiment #2, a polarization diversity transmission occasion (DTO) may increase as a DTO #0, a DTO #1, a DTO #2, a DTO #3, and the like depending on a count of the transmissions (or repetitions). When NPD is 2, a polarization scheme for each DTO may be indicated as in exemplary embodiments below. Depending on a DTO (e.g. count of the transmissions or repetitions), a combination of one polarization scheme or a combination of multiple polarization schemes may be used.

Exemplary embodiments using a combination of one polarization scheme may be as follows.

Exemplary Embodiment #1 of Indicating a Polarization Scheme for Each DTO

{first transmission, second transmission}: {horizontal polarization, vertical polarization} or {linear polarization, linear polarization} may be indicated.

Exemplary Embodiment #2 of Indicating a Polarization Scheme for Each DTO

{first transmission, second transmission}: {+degree polarization (e.g. +45 degree polarization), −degree polarization (e.g. −45 degree polarization)} or {cross polarization, cross polarization} may be indicated.

Exemplary Embodiment #3 of Indicating a Polarization Scheme for Each DTO

{{first transmission, second transmission}: {LHCP, RHCP} or {circular polarization, circular polarization} may be indicated.

Exemplary embodiments using a combination of multiple polarization schemes may be as follows.

Exemplary Embodiment #4 of Indicating a Polarization Scheme for Each DTO

{first transmission, second transmission}: {+degree polarization (e.g. +45 degree polarization), LHCP} or {cross polarization, circular polarization} may be indicated.

Exemplary Embodiment #5 of Indicating a Polarization Scheme for Each DTO

{first transmission, second transmission}: {+degree polarization (e.g. +45 degree polarization), RHCP} or {cross polarization, circular polarization} may be indicated.

Exemplary Embodiment #6 of Indicating a Polarization Scheme for Each DTO

{first transmission, second transmission}: {−degree polarization (e.g. −45 degree polarization), LHCP} or {cross polarization, circular polarization} may be indicated.

Exemplary Embodiment #7 of Indicating a Polarization Scheme for Each DTO

{first transmission, second transmission}: {−degree polarization (e.g. −45 degree polarization), RHCP} or {cross polarization, circular polarization} may be indicated.

Based on the exemplary embodiment #2, a combination of polarization diversity transmission and one or more transmissions among all transmissions that can be retransmitted (e.g. transmission according to slot aggregation, repeated transmission, hybrid automatic repeat request (HARQ) retransmission, ARQ retransmission) may be performed. For a combination of polarization diversity transmission and retransmission mechanism, the following information (e.g. information elements) may be indicated.

When the total number of transmissions is M, TOs for each retransmission mechanism applied to the respective TOs of all transmissions may be replaced by a count scheme for a plurality of TOs.

PDSCH slot aggregation may be considered. The base station may transmit configuration information for slot aggregation transmission to the terminal. The terminal may receive the configuration information for slot aggregation transmission from the base station and perform demodulation and/or decoding operations for a PDSCH based on the configuration information. Depending on a type of DCI format, a value of a new data indicator (NDI) included in a DCI, and/or a type of RNTI used for CRC scrambling of a DCI, a communication node may select one configuration among pdsch-config or sps-config, and determine pdsch-AggregationFactor in the selected configuration (e.g. pdsch-config or sps-config) as an aggregation factor of PDSCH slot aggregation.

Based on the above-described configuration, the base station may indicate to the terminal that the same symbol allocation for the PDSCH is applied in pdsch-AggregationFactor consecutive slots and that PDSCH transmissions are repeated in pdsch-AggregationFactor consecutive slots. The base station may configure a separate RV for each repetition (e.g. TO) according to a value of an RV field in the DCI.

When sps-Config is used (e.g. when sps-Config is set) and there is no DCI scheduling PDSCH slot aggregation, the number of transmissions or repetitions may be assumed to be 0.

The PDSCH slot aggregation may define retransmissions or repeated transmissions during pdsch-AggregationFactor consecutive slots. A slot aggregation transmission occasion (ATO) may increase by 1 for each PDSCH transmission. It may be configured that a separate RV value is applied to each ATO.

The polarization diversity transmission may define $N_{PD}$ retransmissions or repeated transmissions. It may be configured that a separate polarization scheme is applied to each DTO. When two retransmission mechanisms are combined, two TOs (e.g. ATO, DTO) may be defined, or two transmission counts (or repetition counts) may be defined.

When multiple retransmission mechanisms are combined, the number M of total transmissions may be determined, and values of TOs for each retransmission mechanism may be defined for all TOs (e.g. TO #0 to TO #(M−1)). M may be a natural number.

When the number of repetitions is defined, M may indicate the total number of transmissions. M may be set to be equal to or greater than the minimum value (e.g. $\min(N_i)$) of the number of repetitions (e.g. $N_1$, $N_2$, $N_3$, etc.) of each of the retransmission mechanisms. M may be set to be less than or equal to the lowest common multiple (e.g. $\text{LCM}(N_i)$) for the number of repetitions of the respective retransmission mechanisms.

The values of TOs of each retransmission mechanism among all transmissions may be indicated by a separate configuration such as a list (e.g. $\text{TO}_{retx\#1}$, $\text{TO}_{retx\#2}$, ..., and $\text{TO}_{retx\#R}$) having a size of the number R of retransmission mechanisms combined for each TO of all transmissions. The lists corresponding to (the total number M of transmissions × the number R of combined retransmission mechanisms) or information corresponding to the lists may be indicated.

The information corresponding to the lists of TO values may include a method for defining the order or a scheme of counting the respective TOs among the plurality of TOs. Other methods that produce the same effect may be used.

The information corresponding to the list of TO values may include a method for determining the order of counting each TO among a plurality of TOs. The following exemplary embodiment will be described based on a case where polarization diversity transmission and slot aggregation are considered.

If $\{N_{PD}=2,\ \text{aggregationFactor}=2,\ M=4\}$ is configured, ATOs and DTOs may be counted as in exemplary embodiments below.

In an exemplary embodiment #1, an ATO and a DTO may be counted simultaneously. In this case, a DTO may be changed for each ATO. A sequence may be configured as (DTO #0, ATO #0), (DTO #1, ATO #1), (DTO #0, ATO #0), (DTO #1, ATO #1), and the like. Accordingly, one polarization scheme may be applied to one ATO.

In an exemplary embodiment #2, ATOs may be counted first, and a DTO may be counted for every aggregationFactor ATOs. In this case, a sequence may be configured as (DTO #0, ATO #0), (DTO #0, ATO #1), (DTO #1, ATO #0), (DTO #1, ATO #1), and the like. Therefore, one polarization scheme may be applied to aggregationFactor consecutive ATOs.

In an exemplary embodiment #3, DTOs may be counted first, and an ATO may be counted for every $N_{PD}$ DTOs. In this case, a sequence may be configured as (DTO #0, ATO #0), (DTO #1, ATO #0), (DTO #0, ATO #1), (DTO #1, ATO #1), and the like. Therefore, one polarization scheme may be applied to ATOs at an interval of $N_{PD}$.

The exemplary embodiment #3 may be considered as a method for configuring polarization scheme(s). In the exemplary embodiment #3, a fine granularity polarization scheme may be applied. For efficient operation of physical resources, the base station may configure the polarization scheme in more detailed units than the existing unit, and indicate to the terminal information on the configured polarization scheme. For example, an exemplary embodiment #3-1 and an exemplary embodiment #3-2 may be considered as exemplary embodiments of configuring polarization scheme(s) for efficient operation of physical resources. The polarization scheme may be configured for each content transmitted in a physical resource (e.g. all units possible the can be expressed as a combination of modulation symbols). In the exemplary embodiment #3-1, the polarization scheme may be applied for each channel/signal.

Considering the exemplary embodiment #3-1, a polarization scheme may be configured for each information of a physical resource itself (e.g. all units that can be expressed as a combination of REs). Considering the exemplary embodiment #3-2, a polarization scheme may be applied for each physical resource. The exemplary embodiment #3-1 and the exemplary embodiment #3-2 may be performed as follows.

Exemplary Embodiment #3-1 (Application of a Polarization Scheme for Each Channel/Signal)

The base station may indicate to the terminal configuration of a polarization scheme for each content transmitted in a physical resource (e.g. all units that can be expressed as a combination of modulation symbols). The terminal may identify the configuration of the polarization scheme indicated by the base station, and perform signal transmission and reception operations based on the configuration. The configuration (e.g. content) indicated by the base station may include the following information element(s).

Applied mode: All units defined above may be selectively combined. The applied mode may indicate a combination of units.

Applied region: The distinguishers defined above may be selectively combined for the applied mode. The applied region may indicate a combination of distinguishers.

Applied polarization scheme: The indicated polarization scheme may be selected. The applied polarization scheme may indicate the selected polarization scheme.

In downlink communication, a separate polarization scheme may be configured for each of an SSB, CSI-RS, PDCCH, and/or PDSCH. The base station may define an SSB-polarization, CSI-RS-polarization, PDCCH-polarization, and/or PDSCH-polarization, and indicate the SSB-polarization, CSI-RS-polarization, PDCCH-polarization, and/or PDSCH-polarization to the terminal. SSB configuration, CSI-RS configuration, PDCCH configuration, and/or PDSCH configuration may be configured separately for each polarization scheme.

Exemplary Embodiment #3-2 (Application of a Polarization Scheme for Each Physical Resource)

The base station may indicate to the terminal configuration of a polarization scheme for each physical resource. The terminal may identify the configuration of the polarization scheme indicated by the base station, and perform signal transmission and reception operations based on the configuration. The configuration (e.g. content) indicated by the base station may include the following information element(s).

Applied mode: All units defined above may be selectively combined. The applied mode may indicate a combination of units.

Applied region: The distinguishers defined above may be selectively combined for the applied mode. The applied region may indicate a combination of distinguishers.

Applied polarization scheme: The indicated polarization scheme may be selected. The applied polarization scheme may indicate the selected polarization scheme.

A separate polarization scheme may be configured for each BWP. For example, a polarization scheme (e.g. InitialBWPPolarization) for an initiation BWP, a polarization scheme (e.g. BWP1Polarization) for a BWP1, a polarization scheme (e.g. BWP2Polarization) for a BWP2, etc. may be configured. A separate BWP may be configured for each polarization scheme.

When configuring a polarization scheme for each physical resource, two polarization schemes may be used simultaneously. If the two polarization schemes are a polarization pair, overlapping of physical resources (e.g. REs) for the two polarization schemes may be allowed. If the two polarization schemes are not a polarization pair, overlapping of physical resources (e.g. REs) for the two polarization schemes may not be allowed. Alternatively, even when the two polarization schemes are not a polarization pair, overlapping of physical resources (e.g. REs) for the two polarization schemes may be allowed. In this case, priorities for the two polarization schemes may be designated, and the terminal may perform signal transmission and reception operations by considering the priorities.

The two polarization schemes that are a polarization pair may be {LHCP, RHCP}, {horizontal polarization, vertical polarization}, or {+degree polarization, −degree polarization}. The two polarization schemes that are not a polarization pair may be {LHCP, horizontal polarization}, {LHCP, +degree polarization}, {LHCP, linear polarization}, {LHCO, cross polarization}, and the like.

The methods proposed in the present disclosure have been described as a series of operations for clarity of description, but this is not intended to limit the order in which the steps are performed. When necessary, some steps may be performed simultaneously. Alternatively, the steps may be performed in a different order. To implement the methods proposed in the present disclosure, other step(s) may be additionally performed, and performance of some step(s) may be omitted.

The exemplary embodiments proposed in the present disclosure may not be all possible exemplary embodiments, but may be intended to describe representative aspects of the present disclosure. Matters described in the various exemplary embodiments may be applied independently. Alternatively, a combination of two or more of the matters described in the various exemplary embodiments may be applied.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a first communication node, comprising:
generating a first polarized signal by performing first baseband processing on a first set of modulation symbols;
generating a second polarized signal by multiplying the first polarized signal by a first conversion matrix;
generating a third polarized signal by multiplying the first polarized signal by a second conversion matrix; and
transmitting the second polarized signal and the third polarized signal using the same physical resources to a second communication node,
wherein the second polarized signal and the third polarized signal have different polarization schemes.

2. The method according to claim 1, wherein when a first polarization scheme used by the first communication node is different from a second polarization scheme used by the second communication node, a polarization conversion operation using the first conversion matrix is performed.

3. The method according to claim 1, further comprising: receiving, from the second communication node, information of a second polarization scheme used by the second communication node.

4. The method according to claim 1, wherein a polarization scheme for each of the first polarized signal and the second polarized signal is one of linear polarization (LP), horizontal polarization, vertical polarization, circular polarization (CP), left-handed circular polarization (LHCP), right-handed circular polarization (RHCP), cross polarization (XP), +45 degree polarization, or −45 degree polarization.

5. The method according to claim 1, further comprising:
generating a fourth polarized signal by performing second baseband processing on a second set of modulation symbols;
generating a fifth polarized signal by multiplying the fourth polarized signal by a third conversion matrix; and
transmitting the fifth polarized signal to the second communication node,
wherein the second polarized signal and the fifth polarized signal have different polarization schemes, and the first set of modulation symbols and the second set of modulation symbols are sets of modulation symbols for different physical channels, different physical signals, or different resource elements.

6. The method according to claim 1, wherein when a first polarization scheme of the first polarized signal is LP and a second polarization scheme of the second polarized signal is XP, the first conversion matrix includes $C_{LPXP}$, and $C_{LPXP}$ is $$\frac{1}{\sqrt{2}}\begin{bmatrix} 1 & 1 \\ -1 & 1 \end{bmatrix}.$$

7. The method according to claim 1, wherein when a first polarization scheme of the first polarized signal is LP and a second polarization scheme of the second polarized signal is CP, the first conversion matrix includes $C_{LPCP}$, and $C_{LPCP}$ is $$\frac{1}{\sqrt{2}}\begin{bmatrix} 1 & -j \\ 1 & j \end{bmatrix}.$$

8. The method according to claim 1, wherein when a first polarization scheme of the first polarized signal is XP and a second polarization scheme of the second polarized signal is LP, the first conversion matrix includes $C_{XPLP}$, and $C_{XPLP}$ is $$\frac{1}{\sqrt{2}}\begin{bmatrix} 1 & -1 \\ 1 & 1 \end{bmatrix}.$$

9. The method according to claim 1, wherein when a first polarization scheme of the first polarized signal is XP and a second polarization scheme of the second polarized signal is CP, the first conversion matrix includes $C_{XPCP}$, and $C_{XPCP}$ is $$\frac{1}{2}\begin{bmatrix} 1-j & -1-j \\ 1+j & -1+j \end{bmatrix}.$$

10. The method according to claim 1, wherein when a first polarization scheme of the first polarized signal is CP and a second polarization scheme of the second polarized signal is LP, the first conversion matrix includes $C_{CPLP}$, and $C_{CPLP}$ is $$\frac{1}{\sqrt{2}}\begin{bmatrix} 1 & 1 \\ j & -j \end{bmatrix}.$$

11. The method according to claim 1, wherein when a first polarization scheme of the first polarized signal is CP and a second polarization scheme of the second polarized signal is XP, the first conversion matrix includes $C_{CPXP}$, and $C_{CPXP}$ is $$\frac{1}{2}\begin{bmatrix} 1+j & 1-j \\ -1+j & -1-j \end{bmatrix}.$$

12. A method of a second communication node, comprising:
receiving a first polarized signal and a third polarized signal in the same physical resources from a first communication node;
generating a second polarized signal by multiplying the first polarized signal by a first conversion matrix and by multiplying the third polarized signal by a second conversion matrix; and
generating a first set of modulation symbols by performing first baseband processing on the second polarized signal,
wherein the first polarized signal and the third polarized signal have different polarization schemes.

13. The method according to claim 12, wherein when a first polarization scheme used by the first communication node is different from a second polarization scheme used by the second communication node, a polarization conversion operation using the first conversion matrix is performed.

14. The method according to claim 12, wherein a polarization scheme for each of the first polarized signal and the second polarized signal is one of linear polarization (LP), horizontal polarization, vertical polarization, circular polarization (CP), left-handed circular polarization (LHCP), right-handed circular polarization (RHCP), cross polarization (XP), +45 degree polarization, or −45 degree polarization.

15. The method according to claim 12, further comprising:
receiving a fourth polarized signal from the first communication node;
generating a fifth polarized signal by multiplying the fourth polarized signal by a third conversion matrix; and
generating a second set of modulation symbols by performing second baseband processing on the fifth polarized signal,
wherein the first polarized signal and the fourth polarized signal have different polarization schemes, and the first set of modulation symbols and the second set of modulation symbols are sets of modulation symbols for different physical channels, different physical signals, or different resource elements.

16. A first communication node comprising at least one processor,
wherein the at least one processor causes the first communication node to perform:
generating a first polarized signal by performing first baseband processing on a first set of modulation symbols;
generating a second polarized signal by multiplying the first polarized signal by a first conversion matrix;
generating a third polarized signal by multiplying the first polarized signal by a second conversion matrix;
transmitting the second polarized signal and the third polarized signal using the same physical resources to a second communication node,
wherein the second polarized signal and the third polarized signal have different polarization schemes.

17. The first communication node according to claim 16, wherein the at least one processor further causes the first communication node to perform:
generating a fourth polarized signal by performing second baseband processing on a second set of modulation symbols;
generating a fifth polarized signal by multiplying the fourth polarized signal by a third conversion matrix; and
transmitting the fifth polarized signal to the second communication node,
wherein the second polarized signal and the fifth polarized signal have different polarization schemes, and the first set of modulation symbols and the second set of modulation symbols are sets of modulation symbols for different physical channels, different physical signals, or different resource elements.

* * * * *